United States Patent
Akhoondzadehasl et al.

(10) Patent No.: US 12,212,380 B2
(45) Date of Patent: Jan. 28, 2025

(54) LOW POWER PASSIVE MIMO SURFACE USING APERTURE TYPE RADIATORS

(71) Applicant: QUALCOMM Incorporated, San Diego, CA (US)

(72) Inventors: Lida Akhoondzadehasl, Sunnyvale, CA (US); Mohsen Farmahini Farahani, Encinitas, CA (US); Allen Minh-Triet Tran, Rancho Santa Fe, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/951,827

(22) Filed: Sep. 23, 2022

(65) Prior Publication Data

US 2024/0106500 A1 Mar. 28, 2024

(51) Int. Cl.
*H04B 7/04* (2017.01)
*H04B 7/0413* (2017.01)
*H04B 7/155* (2006.01)

(52) U.S. Cl.
CPC ....... *H04B 7/0413* (2013.01); *H04B 7/15507* (2013.01)

(58) Field of Classification Search
CPC ............ H04B 7/04013; H04B 7/04026; H04B 7/0413; H04B 7/145; H04B 7/15507
See application file for complete search history.

(56) References Cited

U.S. PATENT DOCUMENTS

| | | |
|---|---|---|
| 2010/0328174 A1 | 12/2010 | Romanofsky |
| 2021/0181335 A1 | 6/2021 | Lee et al. |
| 2022/0278449 A1* | 9/2022 | Sazegar ............. A61B 17/1615 |
| 2022/0337240 A1* | 10/2022 | Venkatesh ................ H03H 1/00 |
| 2023/0276255 A1 | 8/2023 | Iwabuchi et al. |

FOREIGN PATENT DOCUMENTS

| | | |
|---|---|---|
| EP | 2 741 367 A1 | 6/2014 |
| WO | 2022/018800 A1 | 1/2022 |

OTHER PUBLICATIONS

Perruisseau "IEEE dual polarized and polarization flexible reflective cell with dynamic phase control"; IEEE transaction on antennas and propagation; vol. 58,No. 5 May 2010'pp. 1494-1502 (Year: 2010).*

(Continued)

*Primary Examiner* — Rahel Guarino
(74) *Attorney, Agent, or Firm* — SUNSTEIN LLP/Qualcomm Incorporated

(57) ABSTRACT

Designs and control techniques for passive Multiple-Input Multiple-Output (pMIMO) surfaces are provided. An example array of reconfigurable reflective elements includes a plurality of unit cells each comprising a cross-slot radiating element, a first varactor diode disposed across a first end of the cross-slot radiating element and configured to control polarization in a first plane, and a second varactor diode disposed across a second end of the cross-slot radiating element and configured to control polarization in a second plane, and a controller coupled to the first varactor diode and the second varactor diode and configured to provide control signals to the first varactor diode and the second varactor diode to vary a direction of a reflected signal.

22 Claims, 32 Drawing Sheets

(56) References Cited

OTHER PUBLICATIONS

International Searching Authority/EP, International Search Report and Written Opinion of the International Searching Authority, Application No. PCT/US2023/074306, dated Dec. 20, 2023, 20 pages.
K. Ghorbani et al., "Dual Polarized Wide-Band Aperture Stacked Patch Antennas," IEEE Transactions on Antennas and Propagation, vol. 52, No. 8, Aug. 1, 2004, pp. 2171-2174, XP001200705, ISSN: 0018-926X, DOI: 10.1109/TAP.2004.832484.
Julien Perruisseau-Carrier, "Dual-Polarized and Polarization-Flexible Reflective Cells with Dynamic Phase Control," IEE Transactions of Antennas and Propagation, vol. 58, No. 5, May 1, 2010, pp. 1494-1502, XP011303893, ISSN: 0018-926X.

\* cited by examiner

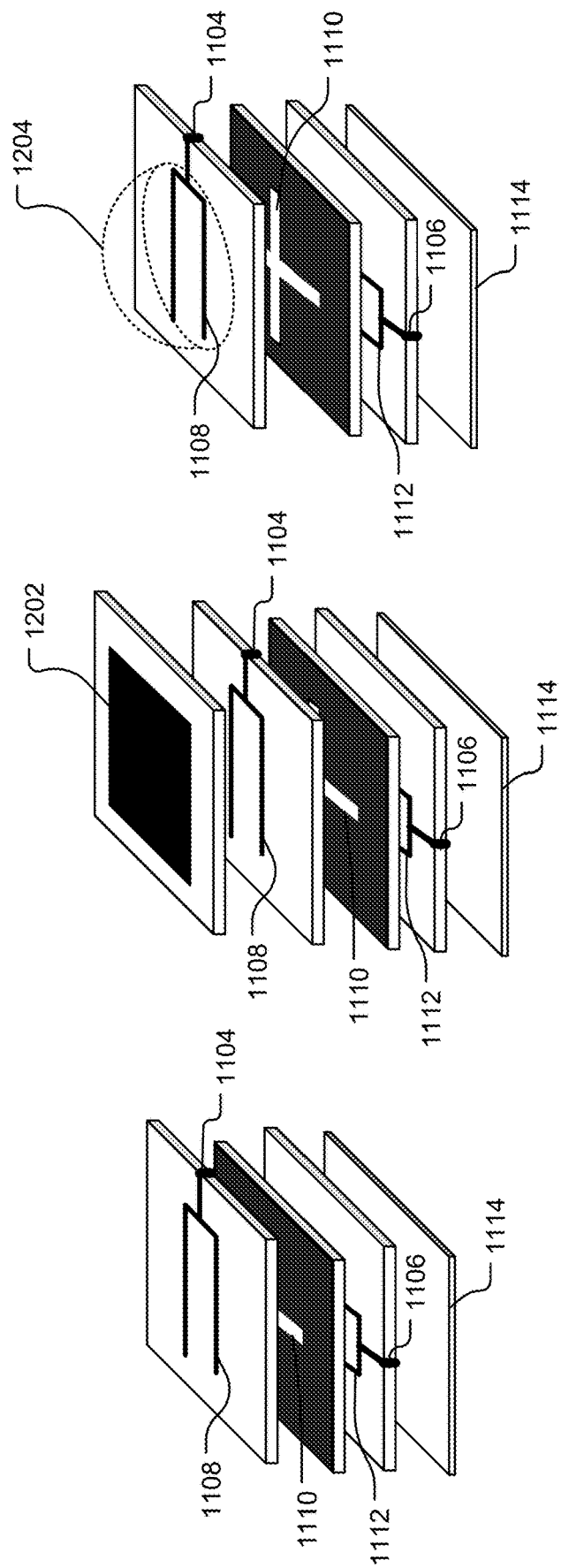

LOW POWER PASSIVE MIMO SURFACE USING APERTURE TYPE RADIATORS

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), and a fifth-generation (5G) service (e.g., 5G New Radio (NR)). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

It is often desirable to know the location of a user equipment (UE), e.g., a cellular phone, with the terms "location" and "position" being synonymous and used interchangeably herein. A location services (LCS) client may desire to know the location of the UE and may communicate with a location center in order to request the location of the UE. The location center and the UE may exchange messages, as appropriate, to obtain a location estimate for the UE. The location center may return the location estimate to the LCS client, e.g., for use in one or more applications.

Obtaining the location of a mobile device that is accessing a wireless network may be useful for many applications including, for example, emergency calls, personal navigation, asset tracking, locating a friend or family member, etc. Existing positioning methods include methods based on measuring radio signals transmitted from a variety of devices including satellite vehicles and terrestrial radio sources in a wireless network such as base stations and access points. Further, the capabilities of UE's may vary and positioning methods may be based on the capabilities of the devices. The orientation of a UE relative to other wireless nodes in a network (e.g., base stations, UEs, and other wireless devices) may be used in beamforming and/or positioning applications. Techniques for controlling beamformed signals may be used to increase the coverage area of a base station and improve the strength of signals transmitted and received by the base station.

SUMMARY

An example array of reconfigurable reflective elements according to the disclosure includes a plurality of unit cells each comprising a radiating element, a first power divider aligned to a first polarization and electrically coupled to a first phase shifting component, and a second power divider aligned to a second polarization and electrically coupled to a second phase shifting component, and a controller coupled to the first phase shifting component and the second phase shifting component and configured to provide control signals to the first phase shifting component and the second phase shifting component to vary a direction of a reflected signal.

An example array of reconfigurable reflective elements according to the disclosure includes a plurality of unit cells each comprising a cross-slot radiating element, a first varactor diode disposed across a first end of the cross-slot radiating element and configured to control polarization in a first plane, and a second varactor diode disposed across a second end of the cross-slot radiating element and configured to control polarization in a second plane, and a controller coupled to the first varactor diode and the second varactor diode and configured to provide control signals to the first varactor diode and the second varactor diode to vary a direction of a reflected signal.

An example method of configuring an array of reconfigurable reflective elements according to the disclosure includes receiving initialization information from a wireless node, determining a first reactance value and a second reactance value for one or more unit cells in the array of reconfigurable reflective elements based at least in part on the initialization information, and configuring the one or more unit cells based on the first reactance value and the second reactance value.

Items and/or techniques described herein may provide one or more of the following capabilities, as well as other capabilities not mentioned. An array of reconfigurable reflective elements may include a plurality of unit cells which may be configured to reflect received radio signals at a desired angle. The unit cells may include radiating elements and configurable phase control devices coupled to a controller, and the controller may provide control signals to the unit cells based on the desired reflection angle. The unit cells may include one phase control device per polarization orientation. The array of reconfigurable reflective elements may receive configuration information from network resources such as base stations, user equipment, and location servers. Arrays of reconfigurable reflective elements may reduce the need for active repeaters and may improve quality of service in non-line-of-sight use cases. The number of phase control devices in the arrays of reconfigurable reflective elements may be reduced and the cost and complexity of controlling an array of reconfigurable reflective elements may also be reduced. Other capabilities may be provided and not every implementation according to the disclosure must provide any, let alone all, of the capabilities discussed.

BRIEF DESCRIPTION OF THE DRAWINGS

FIGS. 12A-12F are diagrams of example pMIMO design variants.

DETAILED DESCRIPTION

Figure 1:
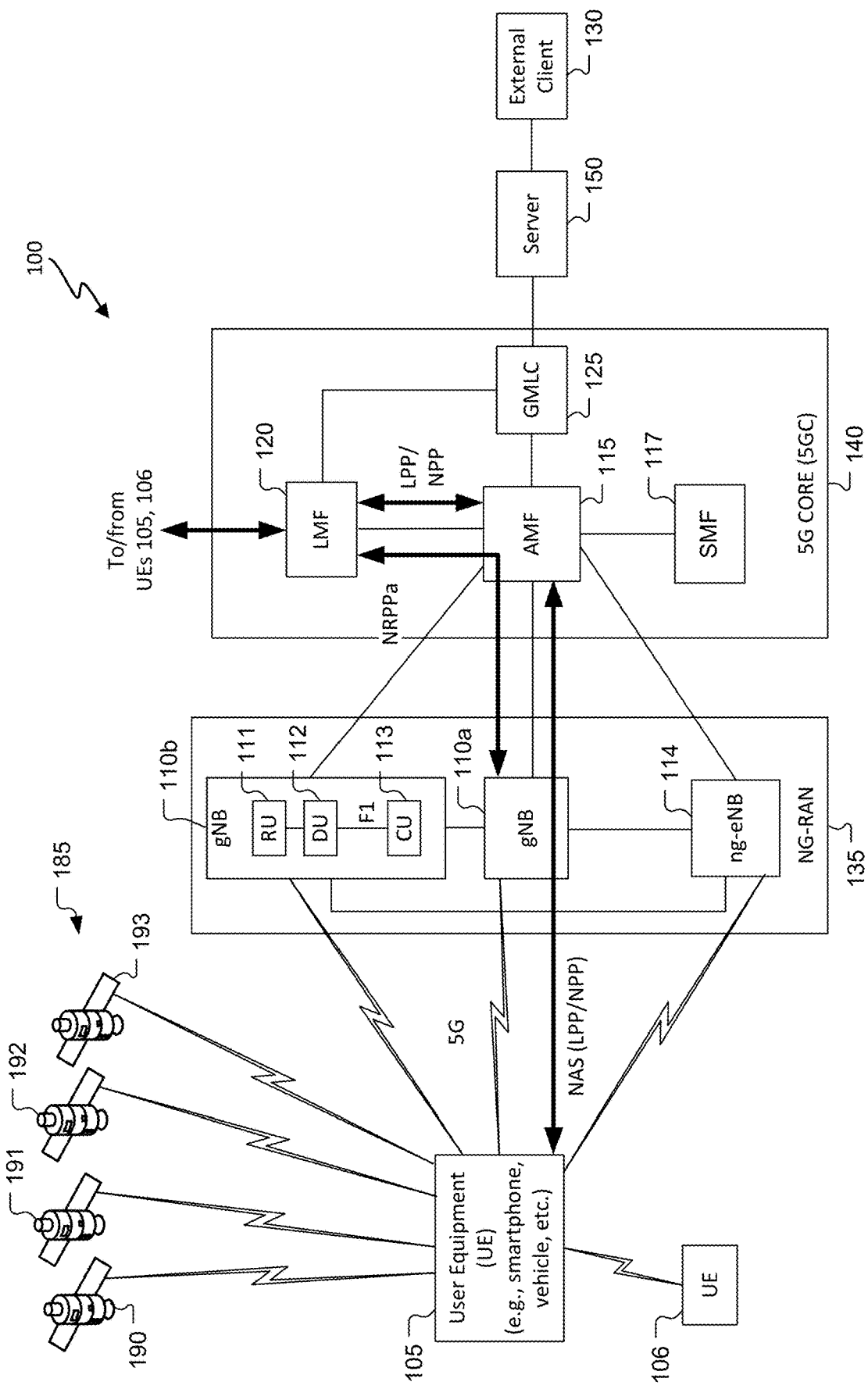
FIG. 1 is a simplified diagram of an example wireless communications system.

Designs and control techniques for passive Multiple-Input Multiple-Output (pMIMO) surfaces are discussed herein. Passive MIMO (pMIMO) surfaces may be utilized to extend the coverage area of wireless stations in wireless networks. In an example, in 5G NR networks, pMIMO surfaces may be implemented to extend the coverage area of a gNB as an alternative option to installing repeater stations. As compared to a repeater installation, a pMIMO surface consumes less power since it does not require power amplifiers (PAs) and low noise amplifiers (LNAs) which are utilized in a repeater station. The pMIMO aperture type designs proposed herein are capable of single or dual polarization with multiple bandwidth enhancement options and improved performance suitable for typical 5G and beyond applications.

Prior reconfigurable reflector array configurations typically require two phase-shifting components per polarization for balanced control to improve co-pol to cross-pol isolation. In some implementations, however, the tolerance of the in-phase setting of the phase-shifter pair may cause a phase imbalance and thus degrade isolation and gain performance of the reflector array. The aperture type designs herein reduce the number of active components as compared to such prior reflecting array configurations and thus provide technical improvements of reducing the complexity of a beam steering controller. This reduction also reduces the calibration time, the number of control lines and routing complexity within the pMIMO surface. The component reduction also may reduce the controller power consumption, and may also decrease the unit cost of a pMIMO array as compared to the prior reflecting array designs.

The pMIMO surfaces described herein may utilize an integrated power combiner to reduce the number of active components (e.g., varactors or phase shifters) required for phase shifting. In an example, the number of varactors utilized may be reduced by 50% as compared to prior reflector surfaces. The designs may enhance frequency bandwidth performance by avoiding the imbalance (e.g., due to tolerances) of prior paired varactor approaches. The bandwidth may be further enhanced by adding parasitic radiating elements on top of a slot aperture. The techniques may be extended to support dual polarizations (e.g., vertical/horizontal, or dual slanted 45 degrees) without impacting the performance of existing polarization due to minimizing coupling with an orthogonal implementation. These techniques and configurations are examples, and other techniques and configurations may be used.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "wireless node," "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, virtual reality headset, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," a "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on.

A base station may operate according to one of several RATs in communication with UEs depending on the network in which it is deployed. Examples of a base station include an Access Point (AP), a Network Node, a NodeB, an evolved NodeB (eNB), or a general Node B (gNodeB, gNB). In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN), here a Fifth Generation (5G) Next Generation (NG) RAN (NG-RAN) 135, a 5G Core Network (5GC) 140, and a server 150. The UE 105 and/or the UE 106 may be, e.g., an IoT device, a location tracker device, a cellular telephone, a vehicle (e.g., a car, a truck, a bus, a boat, etc.), or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5G 140 may conform to current or future standards for 5G support from 3GPP. The NG-RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. Base stations such as the gNBs 110a, 110b and/or the ng-eNB 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more BSs, e.g., one or more of the gNBs 110a, 110b and/or the ng-eNB 114 may be configured to communicate with the UE 105 via multiple carriers. Each of the gNBs 110a, 110b and the ng-eNB 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the gNBs 110a, 110b, the ng-eNB 114, and/or the 5GC 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections.

The UE 105 may be any of a variety of devices, e.g., a smartphone, a tablet computer, a vehicle-based device, etc., but these are examples as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the gNBs 110*a*, 110*b*, the ng-eNB 114, the 5GC 140, and/or the external client 130. For example, such other devices may include internet of thing (IoT) devices, medical devices, home entertainment and/or automation devices, etc. The 5GC 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long-Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH).

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110*a*, 110*b*, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR NodeBs, referred to as the gNBs 110a and 110b. Pairs of the gNBs 110a, 110b in the NG-RAN 135 may be connected to one another via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g. the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

The gNBs 110a, 110b and/or the ng-eNB 114 may each comprise one or more TRPs. For example, each sector within a cell of a BS may comprise a TRP, although multiple TRPs may share one or more components (e.g., share a processor but have separate antennas). The system 100 may include macro TRPs exclusively or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

Each of the gNBs 110a, 110b and/or the ng-eNB 114 may include a radio unit (RU), a distributed unit (DU), and a central unit (CU). For example, the gNB 110a includes an RU 111, a DU 112, and a CU 113. The RU 111, DU 112, and CU 113 divide functionality of the gNB 110a. While the gNB 110a is shown with a single RU, a single DU, and a single CU, a gNB may include one or more RUs, one or more DUs, and/or one or more CUs. An interface between the CU 113 and the DU 112 is referred to as an F1 interface. The RU 111 is configured to perform digital front end (DFE) functions (e.g., analog-to-digital conversion, filtering, power amplification, transmission/reception) and digital beamforming, and includes a portion of the physical (PHY) layer. The RU 111 may perform the DFE using massive multiple input/multiple output (MIMO) and may be integrated with one or more antennas of the gNB 110a. The DU 112 hosts the Radio Link Control (RLC), Medium Access Control (MAC), and physical layers of the gNB 110a. One DU can support one or more cells, and each cell is supported by a single DU. The operation of the DU 112 is controlled by the CU 113. The CU 113 is configured to perform functions for transferring user data, mobility control, radio access network sharing, positioning, session management, etc. although some functions are allocated exclusively to the DU 112. The CU 113 hosts the Radio Resource Control (RRC), Service Data Adaptation Protocol (SDAP), and Packet Data Convergence Protocol (PDCP) protocols of the gNB 110a. The UE 105 may communicate with the CU 113 via RRC, SDAP, and PDCP layers, with the DU 112 via the RLC, MAC, and PHY layers, and with the RU 111 via the PHY layer.

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the gNBs 110a, 110b and/or the ng-eNB 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematic (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g. by the LMF 120). The AMF 115 may serve as a control node that processes signaling between the UE 105 and the 5GC 140, and may provide QoS (Quality of Service) flow and session management. The AMF 115 may support mobility of the UE 105 including cell change and handover and may participate in supporting signaling connection to the UE 105.

The server 150, e.g., a cloud server, is configured to obtain and provide location estimates of the UE 105 to the external client 130. The server 150 may, for example, be configured to run a microservice/service that obtains the location estimate of the UE 105. The server 150 may, for example, pull the location estimate from (e.g., by sending a location request to) the UE 105, one or more of the gNBs 110a, 110b (e.g., via the RU 111, the DU 112, and the CU 113) and/or the ng-eNB 114, and/or the LMF 120. As another example, the UE 105, one or more of the gNBs 110a, 110b (e.g., via the RU 111, the DU 112, and the CU 113), and/or the LMF 120 may push the location estimate of the UE 105 to the server 150.

The GMLC 125 may support a location request for the UE 105 received from the external client 130 via the server 150 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130 via the server 150. The GMLC 125 is shown connected to both the AMF 115 and LMF 120, though may not be connected to the AMF 115 or the LMF 120 in some implementations.

As further illustrated in FIG. 1, the LMF 120 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110a, 110b or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110a, 110b or the ng-eNB 114) and/or may be used by the LMF 120 to obtain location related information from the gNBs 110a, 110b and/or the ng-eNB 114, such as parameters defining directional SS transmissions from the gNBs 110a, 110b, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114) or APs may obtain location measurements (e.g., measurements of RSSI, RTT, RSRP, RSRQ or Time of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110a, 110b, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 140. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS beams from a plurality of base stations (such as the gNBs 110a, 110b, the ng-eNB 114, etc.) to compute the UE's position.

Figure 2:
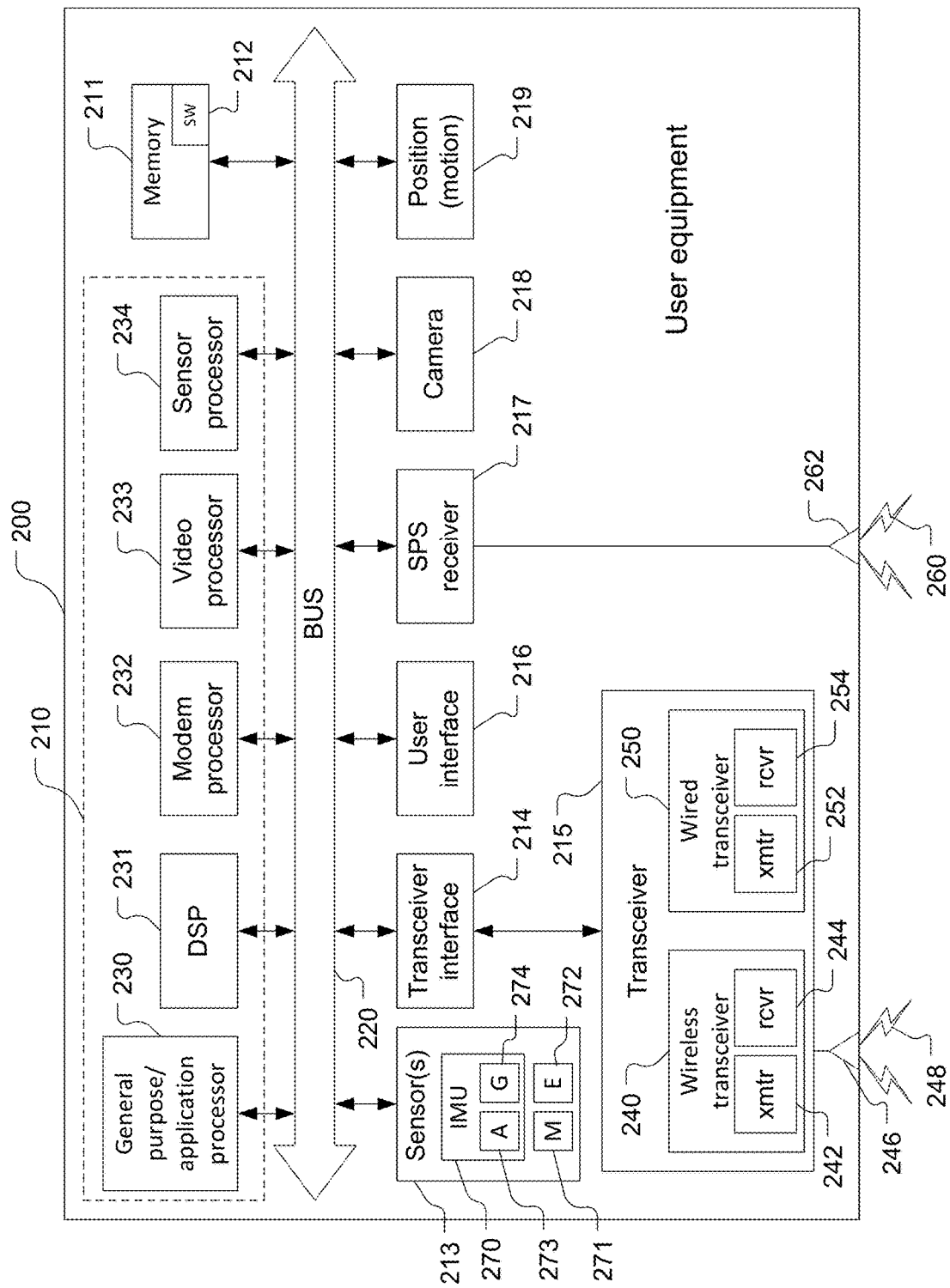
FIG. 2 is a block diagram of components of an example user equipment.

Referring also to FIG. 2, a UE 200 is an example of the UE 105 and comprises a computing platform including one or more processors 210, memory 211 including software (SW) 212, one or more sensors 213, a transceiver interface 214 for a transceiver 215 (that includes one or more wireless transceivers 240, and a wired transceiver 250), a user interface 216, a Satellite Positioning System (SPS) receiver 217, a camera 218, and a position (motion) device 219. The processors 210, the memory 211, the sensor(s) 213, the transceiver interface 214, the user interface 216, the SPS receiver 217, the camera 218, and the position (motion) device 219 may be communicatively coupled to each other by a bus 220 (which may be configured, e.g., for optical and/or electrical communication). One or more of the shown apparatus (e.g., the camera 218, the position (motion) device 219, and/or one or more of the sensor(s) 213, etc.) may be omitted from the UE 200. The processors 210 may include one or more intelligent hardware devices, e.g., a central processing unit (CPU), a microcontroller, an application specific integrated circuit (ASIC), etc. The processors 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for radio frequency (RF) sensing (with one or more wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processors 210 to perform various functions described herein. Alternatively, the software 212 may not be directly executable by the processors 210 but may be configured to cause the processors 210, e.g., when compiled and executed, to perform the functions. The description may refer to the processors 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensor(s) 213, the user interface 216, the SPS receiver 217, the camera 218, the position (motion) device PMD 219, and/or the wired transceiver 250.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the general-purpose processor 230 and/or the DSP 231. Other configurations, however, may be used to perform baseband processing.

The UE 200 may include the sensor(s) 213 that may include, for example, an Inertial Measurement Unit (IMU) 270, one or more magnetometers 271, and/or one or more environment sensors 272. The IMU 270 may comprise one or more inertial sensors, for example, one or more accelerometers 273 (e.g., collectively responding to acceleration of the UE 200 in three dimensions) and/or one or more gyroscopes 274. The magnetometer(s) may provide measurements to determine orientation (e.g., relative to magnetic north and/or true north) that may be used for any of a variety of purposes, e.g., to support one or more compass applications. The environment sensor(s) 272 may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the general-purpose processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/ IMU can be used to determine the angle and/or orientation of the other device with respect to the UE 200, etc.

The IMU 270 may be configured to provide measurements about a direction of motion and/or a speed of motion of the UE 200, which may be used in relative location determination. For example, the one or more accelerometers 273 and/or the one or more gyroscopes 274 of the IMU 270 may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) 273 and gyroscope(s) 274 taken after this moment in time may be used in dead reckoning to determine present location of the UE 200 based on movement (direction and distance) of the UE 200 relative to the reference location.

The magnetometer(s) 271 may determine magnetic field strengths in different directions which may be used to determine orientation of the UE 200. For example, the orientation may be used to provide a digital compass for the UE 200. The magnetometer(s) 271 may include a two-dimensional magnetometer configured to detect and provide indications of magnetic field strength in two orthogonal dimensions. Also or alternatively, the magnetometer(s) 271 may include a three-dimensional magnetometer configured to detect and provide indications of magnetic field strength in three orthogonal dimensions. The magnetometer(s) 271 may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a transmitter 242 and receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the transmitter 242 may include multiple transmitters that may be discrete components or combined/ integrated components, and/or the receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-Vehicle-to-Everything (V2X), PCS, IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a transmitter 252 and a receiver 254 configured for wired communication, e.g., with the NG-RAN 135 to send communications to, and receive communications from, the gNB 110a, for example. The transmitter 252 may include multiple transmitters that may be discrete components or combined/integrated components, and/or the receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless SPS signals 260 to wired signals, e.g., electrical or optical signals, and may be integrated with the antennas 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The PMD 219 may be configured to determine a position and possibly motion of the UE 200. For example, the PMD 219 may communicate with, and/or include some or all of, the SPS receiver 217. The PMD 219 may also or alternatively be configured to determine location of the UE 200 using terrestrial-based signals (e.g., at least some of the wireless signals 248) for trilateration, for assistance with obtaining and using the SPS signals 260, or both. The PMD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PMD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the general-purpose processor 230 and/or the DSP 231) may be configured to use to determine motion (e.g., a velocity vector and/or an acceleration vector) of the UE 200. The PMD 219 may be configured to provide indications of uncertainty and/or error in the determined position and/or motion.

Figure 3:
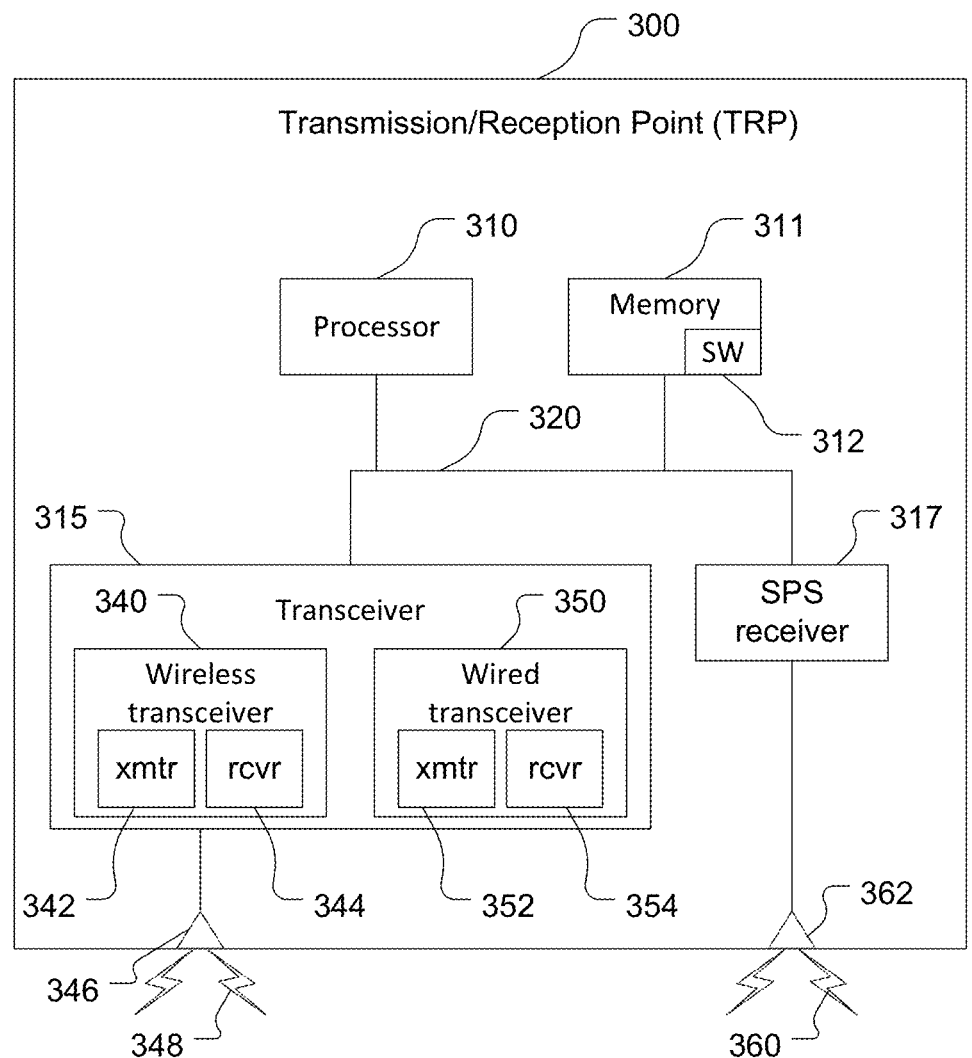
FIG. 3 is a block diagram of components of an example transmission/reception point.

Referring also to FIG. 3, an example of a TRP 300 of the BSs (e.g., gNB 110a, gNB 110b, ng-eNB 114) comprises a computing platform including a processor 310, memory 311 including software (SW) 312, a transceiver 315, and (optionally) an SPS receiver 317. The processor 310, the memory 311, the transceiver 315, and the SPS receiver 317 may be communicatively coupled to each other by a bus 320 (which may be configured, e.g., for optical and/or electrical communication). One or more of the shown apparatus (e.g., a wireless interface and/or the SPS receiver 317) may be omitted from the TRP 300. The SPS receiver 317 may be configured similarly to the SPS receiver 217 to be capable of receiving and acquiring SPS signals 360 via an SPS antenna 362. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions. The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components of the TRP 300 (and thus of one of the gNB 110a, gNB 110b, ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and a wired transceiver 350 configured to communicate with other devices through wireless connections and wired connections, respectively. For example, the wireless transceiver 340 may include a transmitter 342 and receiver 344 coupled to one or more antennas 346 for transmitting (e.g., on one or more uplink or downlink channels, and/or one or more sidelink channels) and/or receiving (e.g., on one or more downlink or uplink channels, and/or one or more sidelink channels) wireless signals 348 and transducing signals from the wireless signals 348 to wired (e.g., electrical and/or optical) signals and from wired (e.g., electrical and/or optical) signals to the wireless signals 348. Thus, the transmitter 342 may include multiple transmitters that may be discrete components or combined/integrated components, and/or the receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a transmitter 352 and a receiver 354 configured for wired communication, e.g., with the network 140 to send communications to, and receive communications from, the LMF 120, for example. The transmitter 352 may include multiple transmitters that may be discrete components or combined/integrated components, and/or the receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
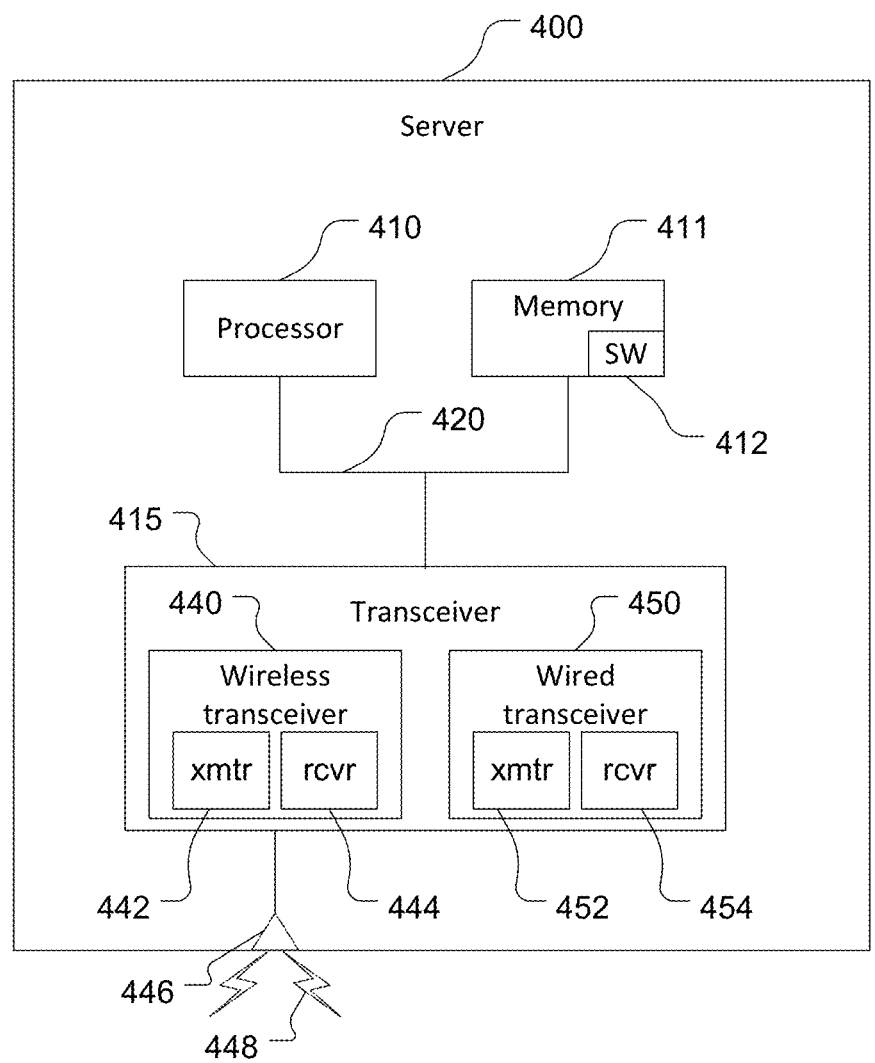
FIG. 4 is a block diagram of components of an example server.

Referring also to FIG. 4, an example of the LMF 120 comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 (or the LMF 120) performing a function as shorthand for one or more appropriate components of the server 400 (e.g., the LMF 120) performing the function. The processor 410 may include a memory with stored instructions in addition to and/or instead of the memory 411. Functionality of the processor 410 is discussed more fully below.

The transceiver 415 may include a wireless transceiver 440 and a wired transceiver 450 configured to communicate with other devices through wireless connections and wired connections, respectively. For example, the wireless transceiver 440 may include a transmitter 442 and receiver 444 coupled to one or more antennas 446 for transmitting (e.g., on one or more uplink channels) and/or receiving (e.g., on one or more downlink channels) wireless signals 448 and transducing signals from the wireless signals 448 to wired (e.g., electrical and/or optical) signals and from wired (e.g., electrical and/or optical) signals to the wireless signals 448. Thus, the transmitter 442 may include multiple transmitters that may be discrete components or combined/integrated components, and/or the receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a transmitter 452 and a receiver 454 configured for wired communication, e.g., with the NG-RAN 135 to send communications to, and receive communications from, the TRP 300, for example. The transmitter 452 may include multiple transmitters that may be discrete components or combined/integrated components, and/or the receiver 454 may include multiple receivers that may be discrete components or combined/integrated components. The wired transceiver 450 may be configured, e.g., for optical communication and/or electrical communication.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

One or more of many different techniques may be used to determine position of an entity such as the UE 105. For example, known position-determination techniques include RTT, multi-RTT, RSTD (e.g., OTDOA, also called TDOA and including UL-TDOA and DL-TDOA), Enhanced Cell Identification (E-CID), DL-AoD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In RSTD techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In RSTD, the difference in arrival times at a receiving device of signals from different sources along with known locations of the sources and known offset of transmission times from the sources are used to determine the location of the receiving device.

Figure 5:
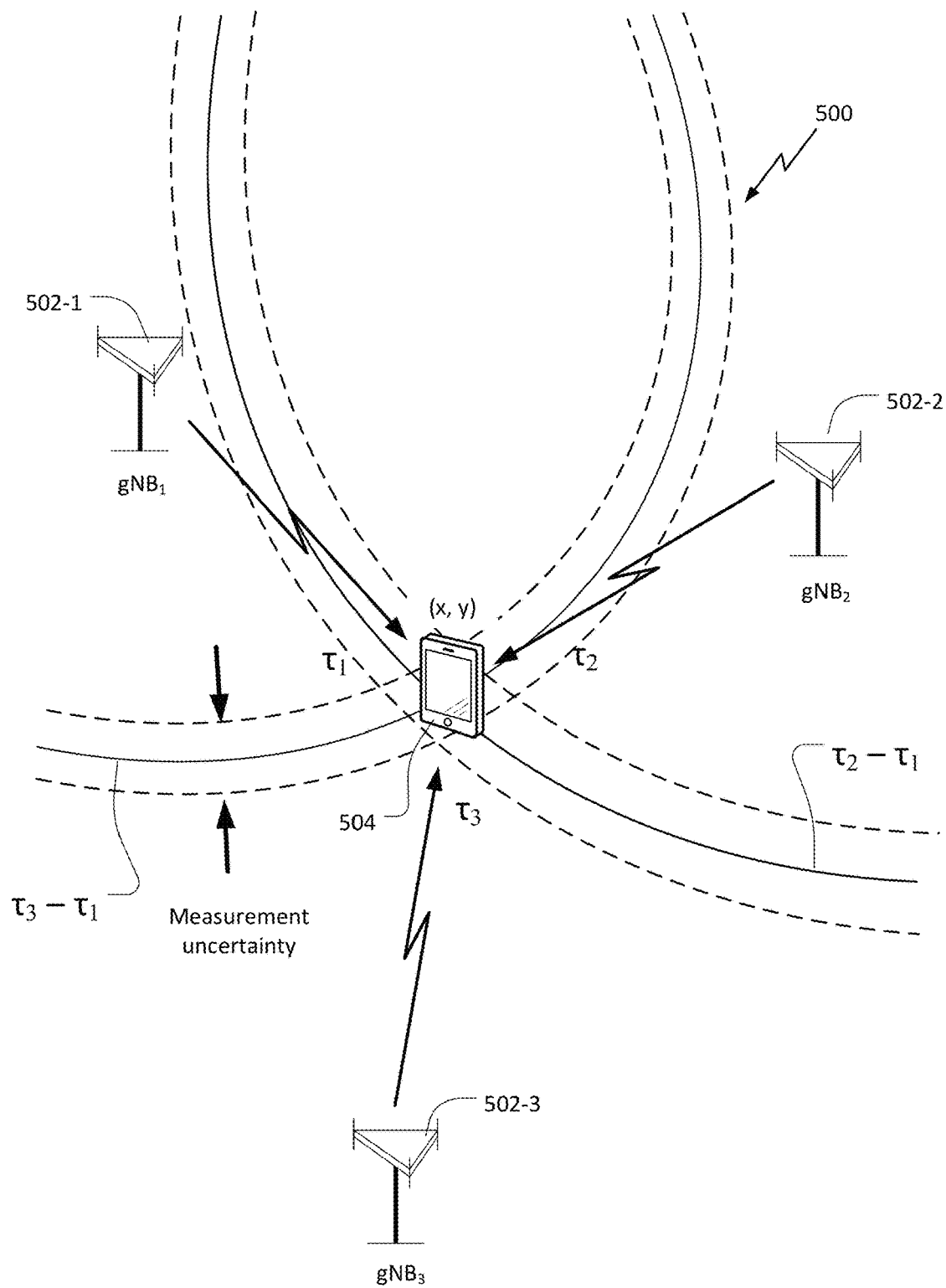
FIGS. 5, 6A and 6B are diagrams illustrating example techniques for determining a position of a mobile device using information obtained from one or more base stations.

Referring to FIG. 5, an example wireless communications system 500 according to various aspects of the disclosure is shown. In the example of FIG. 5, a UE 504, which may correspond to any of the UEs described herein, is attempting to calculate an estimate of its position, or assist another entity (e.g., a base station or core network component, another UE, a location server, a third party application, etc.) to calculate an estimate of its position. The UE 504 may communicate wirelessly with a plurality of base stations 502-1, 502-2, and 502-3 which may correspond to any combination of the base stations described herein, using RF signals and standardized protocols for the modulation of the RF signals and the exchange of information packets. By extracting different types of information from the exchanged RF signals, and utilizing the layout of the wireless communications system 500 (e.g., the base stations locations, orientation of the antennas, geometry, etc.), the UE 504 may determine its position, or assist in the determination of its position, in a predefined reference coordinate system. In an aspect, the UE 504 may specify its position using a two-dimensional (2D) coordinate system; however, the aspects disclosed herein are not so limited, and may also be applicable to determining positions using a three-dimensional (3D) coordinate system, if the extra dimension is desired. Additionally, while FIG. 5 illustrates one UE 504 and three base stations 502-1, 502-2, 502-3, as will be appreciated, there may be more UEs 504 and more or fewer base stations.

To support position estimates, the base stations 502-1, 502-2, 502-3 may be configured to broadcast positioning reference signals (e.g., PRS, NRS, TRS, CRS, etc.) to UEs in their coverage area to enable a UE 504 to measure characteristics of such reference signals. For example, the observed time difference of arrival (OTDOA) positioning method is a multilateration method in which the UE 504 measures the time difference, known as a reference signal time difference (RSTD), between specific reference signals (e.g., PRS, CRS, CSI-RS, etc.) transmitted by different pairs of network nodes (e.g., base stations, antennas of base stations, etc.) and either reports these time differences to a location server, such as the server 400 (e.g., the LMF 120), or computes a location estimate itself from these time differences.

Generally, RSTDs are measured between a reference network node (e.g., base station 502-1 in the example of FIG. 5) and one or more neighbor network nodes (e.g., base stations 502-2 and 502-3 in the example of FIG. 5). The reference network node remains the same for all RSTDs measured by the UE 504 for any single positioning use of OTDOA and would typically correspond to the serving cell for the UE 504 or another nearby cell with good signal strength at the UE 504. In an aspect, where a measured network node is a cell supported by a base station, the neighbor network nodes would normally be cells supported by base stations different from the base station for the reference cell and may have good or poor signal strength at the UE 504. The location computation can be based on the measured time differences (e.g., RSTDs) and knowledge of the network nodes' locations and relative transmission timing (e.g., regarding whether network nodes are accurately synchronized or whether each network node transmits with some known time difference relative to other network nodes).

To assist positioning operations, a location server (e.g., server 400, LMF 120) may provide OTDOA assistance data to the UE 504 for the reference network node (e.g., base station 502-1 in the example of FIG. 5) and the neighbor network nodes (e.g., base stations 502-2 and 502-3 in the example of FIG. 5) relative to the reference network node. For example, the assistance data may provide the center channel frequency of each network node, various reference signal configuration parameters (e.g., the number of consecutive positioning subframes, periodicity of positioning subframes, muting sequence, frequency hopping sequence, reference signal identifier (ID), reference signal bandwidth), a network node global ID, and/or other cell related parameters applicable to OTDOA. The OTDOA assistance data may indicate the serving cell for the UE 504 as the reference network node.

In some cases, OTDOA assistance data may also include "expected RSTD" parameters, which provide the UE 504 with information about the RSTD values the UE 504 is expected to measure at its current location between the reference network node and each neighbor network node, together with an uncertainty of the expected RSTD parameter. The expected RSTD, together with the associated uncertainty, may define a search window for the UE 504 within which the UE 504 is expected to measure the RSTD value. OTDOA assistance information may also include reference signal configuration information parameters, which allow a UE 504 to determine when a reference signal positioning occasion occurs on signals received from various neighbor network nodes relative to reference signal positioning occasions for the reference network node, and to determine the reference signal sequence transmitted from various network nodes in order to measure a signal time of arrival (ToA) or RSTD.

In an aspect, while the location server (e.g., server 400, LMF 120) may send the assistance data to the UE 504, alternatively, the assistance data can originate directly from the network nodes (e.g., base stations 502) themselves (e.g., in periodically broadcasted overhead messages, etc.). Alternatively, the UE 504 can detect neighbor network nodes itself without the use of assistance data.

The UE 504 (e.g., based in part on the assistance data, if provided) can measure and (optionally) report the RSTDs between reference signals received from pairs of network nodes. Using the RSTD measurements, the known absolute or relative transmission timing of each network node, and the known position(s) of the transmitting antennas for the reference and neighboring network nodes, the network (e.g., server 400, LMF 120, a base station 502) or the UE 504 may estimate a position of the UE 504. More particularly, the RSTD for a neighbor network node "k" relative to a reference network node "Ref" may be given as (ToAk−ToARef), where the ToA values may be measured modulo one subframe duration (1 ms) to remove the effects of measuring different subframes at different times. In the example of FIG. 5, the measured time differences between the reference cell of base station 502-1 and the cells of neighboring base stations 502-2 and 502-3 are represented as $\tau2-\tau1$ and $\tau3-\tau1$, where T1, T2, and T3 represent the ToA of a reference signal from the transmitting antenna(s) of base station 502-1, 502-2, and 502-3, respectively. The UE 504 may then convert the ToA measurements for different network nodes to RSTD measurements and (optionally) send them to the server 400/LMF 120. Using (i) the RSTD measurements, (ii) the known absolute or relative transmission timing of each network node, (iii) the known position(s) of physical transmitting antennas for the reference and neighboring network nodes, and/or (iv) directional reference signal characteristics such as a direction of transmission, the UE's 504 position may be determined (either by the UE 504 or the server 400/LMF 120).

Still referring to FIG. 5, when the UE 504 obtains a location estimate using OTDOA measured time differences, the necessary additional data (e.g., the network nodes' locations and relative transmission timing) may be provided to the UE 504 by a location server (e.g., server 400, LMF 120). In some implementations, a location estimate for the UE 504 may be obtained (e.g., by the UE 504 itself or by the server 400/LMF 120) from OTDOA measured time differences and from other measurements made by the UE 504 (e.g., measurements of signal timing from global positioning system (GPS) or other global navigation satellite system (GNSS) satellites). In these implementations, known as hybrid positioning, the OTDOA measurements may contribute towards obtaining the UE's 504 location estimate but may not wholly determine the location estimate.

Uplink time difference of arrival (UTDOA) is a similar positioning method to OTDOA, but is based on uplink reference signals (e.g., sounding reference signals (SRS), uplink positioning reference signals (UL PRS), SRS for positioning signals) transmitted by the UE (e.g., UE 504). Further, transmission and/or reception beamforming at the base station 502-1, 502-2, 502-3 and/or UE 504 can enable wideband bandwidth at the cell edge for increased precision. Beam refinements may also leverage channel reciprocity procedures in 5G NR.

In NR, there is no requirement for precise timing synchronization across the network. Instead, it is sufficient to have coarse time-synchronization across gNBs (e.g., within a cyclic prefix (CP) duration of the OFDM symbols). Coarse timing synchronization is generally sufficient for Round-trip-time (RTT)-based methods, and the sidelink assisted methods described herein, and as such, are a practical positioning methods in NR.

Figure 6A:
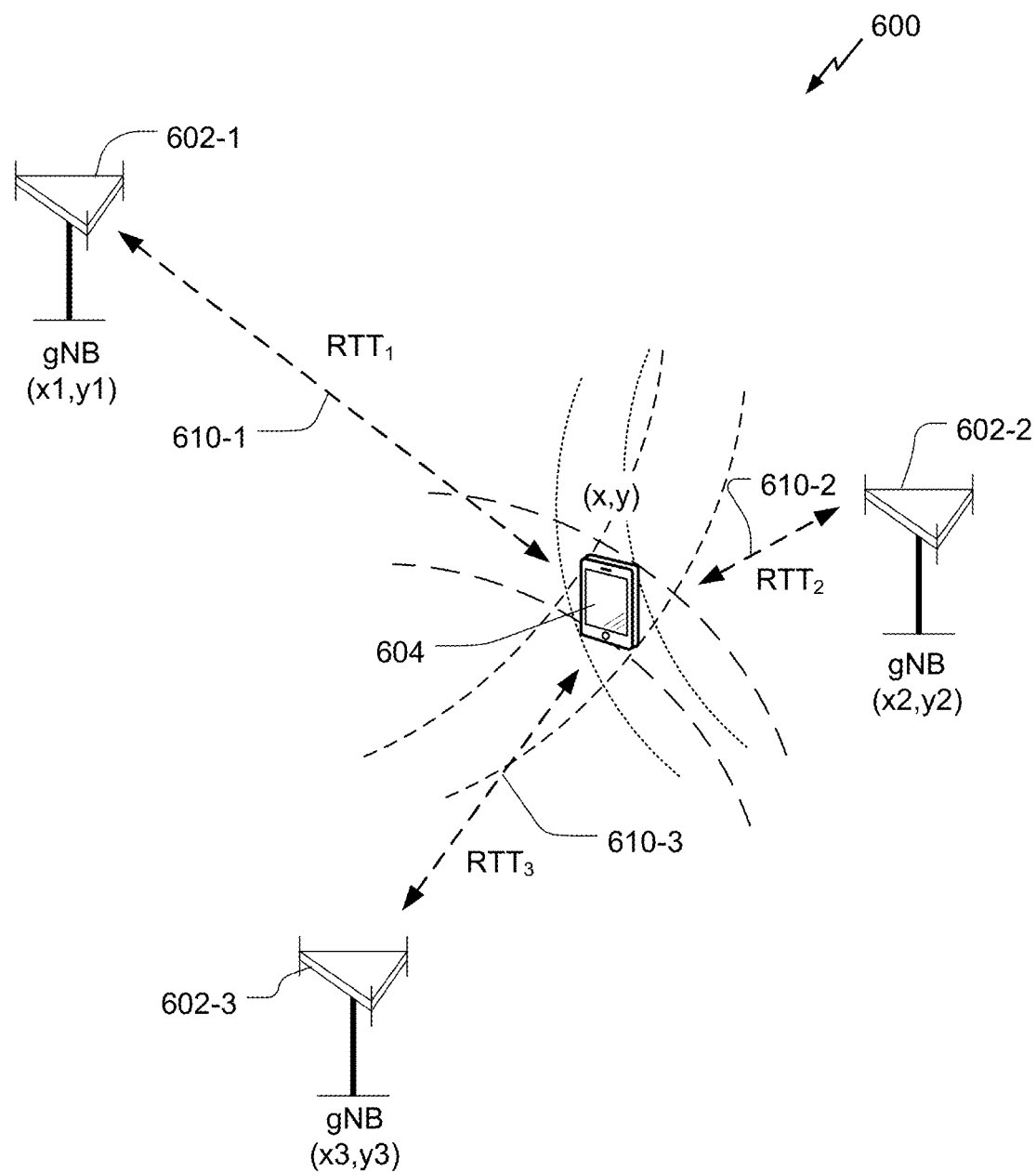

Referring to FIG. 6A, an exemplary wireless communications system 600 according to aspects of the disclosure is shown. In the example of FIG. 6A, a UE 604 (which may correspond to any of the UEs described herein) is attempting to calculate an estimate of its position, or assist another entity (e.g., a base station or core network component, another UE, a location server, a third party application, etc.) to calculate an estimate of its position. The UE 604 may communicate wirelessly with a plurality of base stations 602-1, 602-2, and 602-3 (which may correspond to any of the base stations described herein) using RF signals and standardized protocols for the modulation of the RF signals and the exchange of information packets. By extracting different types of information from the exchanged RF signals, and utilizing the layout of the wireless communications system 600 (i.e., the base stations' locations, geometry, etc.), the UE 604 may determine its position, or assist in the determination of its position, in a predefined reference coordinate system. In an aspect, the UE 604 may specify its position using a two-dimensional coordinate system; however, the aspects disclosed herein are not so limited, and may also be applicable to determining positions using a three-dimensional coordinate system, if the extra dimension is desired. Additionally, while FIG. 6A illustrates one UE 604 and three base stations 602-1, 602-2, 602-3, as will be appreciated, there may be more UEs 604 and more base stations.

To support position estimates, the base stations 602-1, 602-2, 602-3 may be configured to broadcast reference RF signals (e.g., PRS, NRS, CRS, TRS, CSI-RS, PSS, SSS, etc.) to UEs 604 in their coverage area to enable a UE 604 to measure characteristics of such reference RF signals. For example, the UE 604 may measure the ToA of specific reference RF signals (e.g., PRS, NRS, CRS, CSI-RS, etc.) transmitted by at least three different base stations and may use the RTT positioning method to report these ToAs (and additional information) back to the serving base station (e.g., base station 602-2) or another positioning entity (e.g., server 400, LMF 120).

In an aspect, although described as the UE 604 measuring reference RF signals from a base station 602-1, 602-2, 602-3, the UE 604 may measure reference RF signals from one of multiple cells supported by a base station 602-1, 602-2, 602-3. Where the UE 604 measures reference RF signals transmitted by a cell supported by a base station 602-2, the at least two other reference RF signals measured by the UE 604 to perform the RTT procedure would be from cells supported by base stations 602-1, 602-3 different from the first base station 602-2 and may have good or poor signal strength at the UE 604.

In order to determine the position (x, y) of the UE 604, the entity determining the position of the UE 604 needs to know the locations of the base stations 602-1, 602-2, 602-3, which may be represented in a reference coordinate system as $(x_k, y_k)$, where k=1, 2, 3 in the example of FIG. 6A. Where one of the base stations 602-2 (e.g., the serving base station) or the UE 604 determines the position of the UE 604, the locations of the involved base stations 602-1, 602-3 may be provided to the serving base station 602-2 or the UE 604 by a location server with knowledge of the network geometry (e.g., server 400, LMF 120). Alternatively, the location server may determine the position of the UE 604 using the known network geometry.

Either the UE 604 or the respective base station 602-1, 602-2, 602-3 may determine the distance ($d_k$, where k=1, 2, 3) between the UE 604 and the respective base station 602-1, 602-2, 602-3. In an aspect, determining the RTT 610-1, 610-2, 610-3 of signals exchanged between the UE 604 and any base station 602-1, 602-2, 602-3 can be performed and converted to a distance ($d_k$). RTT techniques can measure the time between sending a signaling message (e.g., reference RF signals) and receiving a response. These methods may utilize calibration to remove any processing and hardware delays. In some environments, it may be assumed that the processing delays for the UE 604 and the base stations 602-1, 602-2, 602-3 are the same. However, such an assumption may not be true in practice.

Once each distance $d_k$ is determined, the UE 604, a base station 602-1, 602-2, 602-3, or the location server (e.g., server 400, LMF 120) can solve for the position (x, y) of the UE 604 by using a variety of known geometric techniques, such as, for example, trilateration. From FIG. 6A, it can be seen that the position of the UE 604 ideally lies at the common intersection of three semicircles, each semicircle being defined by radius $d_k$ and center $(x_k, y_k)$, where k=1, 2, 3.

Figure 6B:
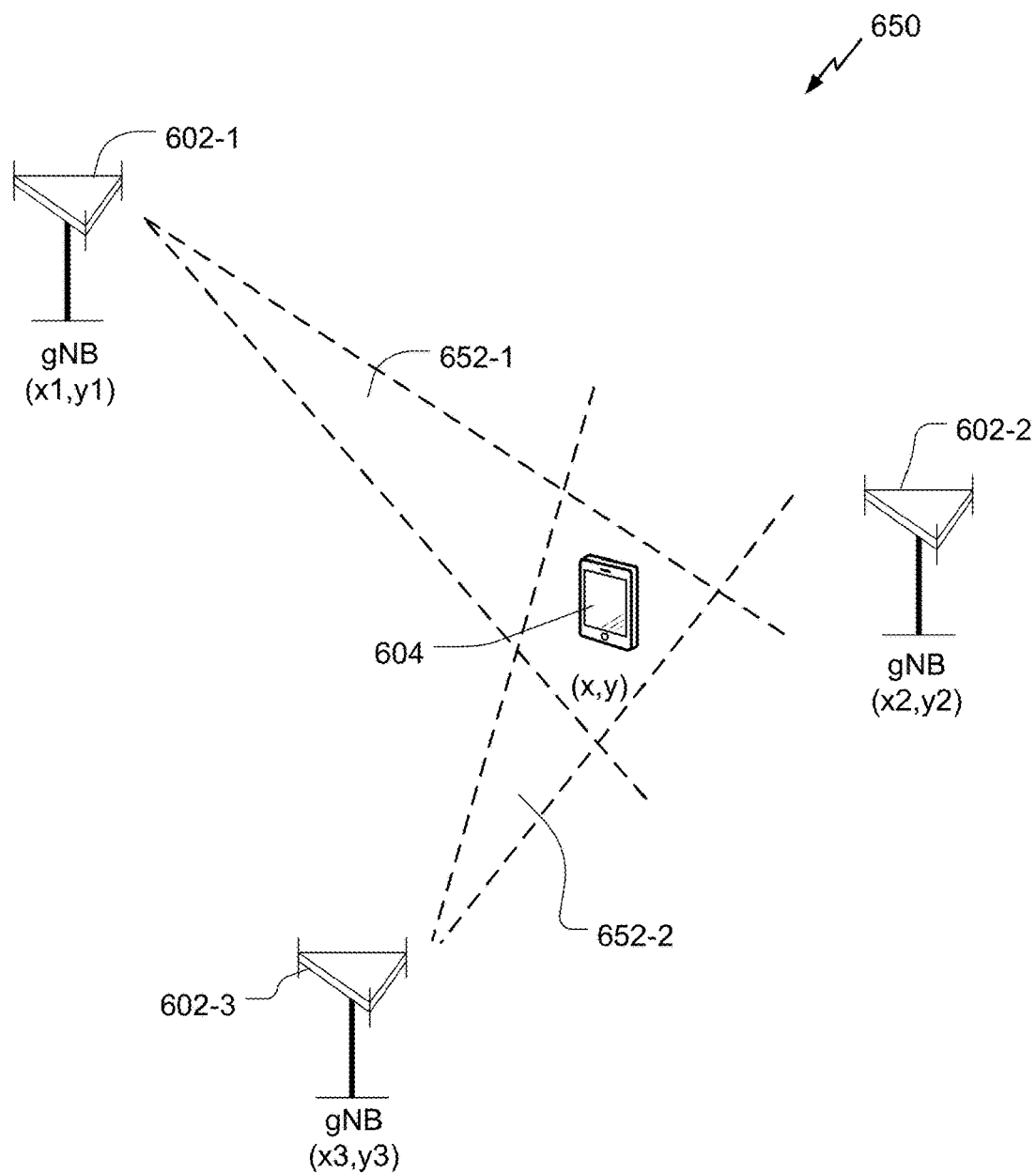

Referring to FIG. 6B, a diagram 650 of an example position estimate based on beamforming is shown. In an example, additional location information may be obtained in the form of an angle of arrival (AoA) or angle of departure (AoD) that defines a straight line direction (e.g., which may be in a horizontal plane or in three dimensions) or possibly a range of directions (e.g., for the UE 604 from the location of a base station 602-1, 602-2, 602-3). The intersection of the two directions at or near the point (x, y) can provide another estimate of the location for the UE 604. For example, a first beam 652-1 transmitted from the first station 602-1 may define a coverage area within the dimensions of the expected propagation path of the beam. In an example, the dimensions of the beam in combination with a range measurement may be used to generate a position for UE 604. Other beams may also be used to refine or determine a position of the UE 604. For example, a second beam 652-2 transmitted from the third base station 602-3 may be used to determine a bearing of the UE 604 relative to the third base station 602-3. A location estimate or the UE 604 may be based on the area of intersection between the first and second beams 652-1, 652-2. Other range measurements and beam angles may also be used to determine the position of the UE 604.

A position estimate (e.g., for a UE 604) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

Figure 7:
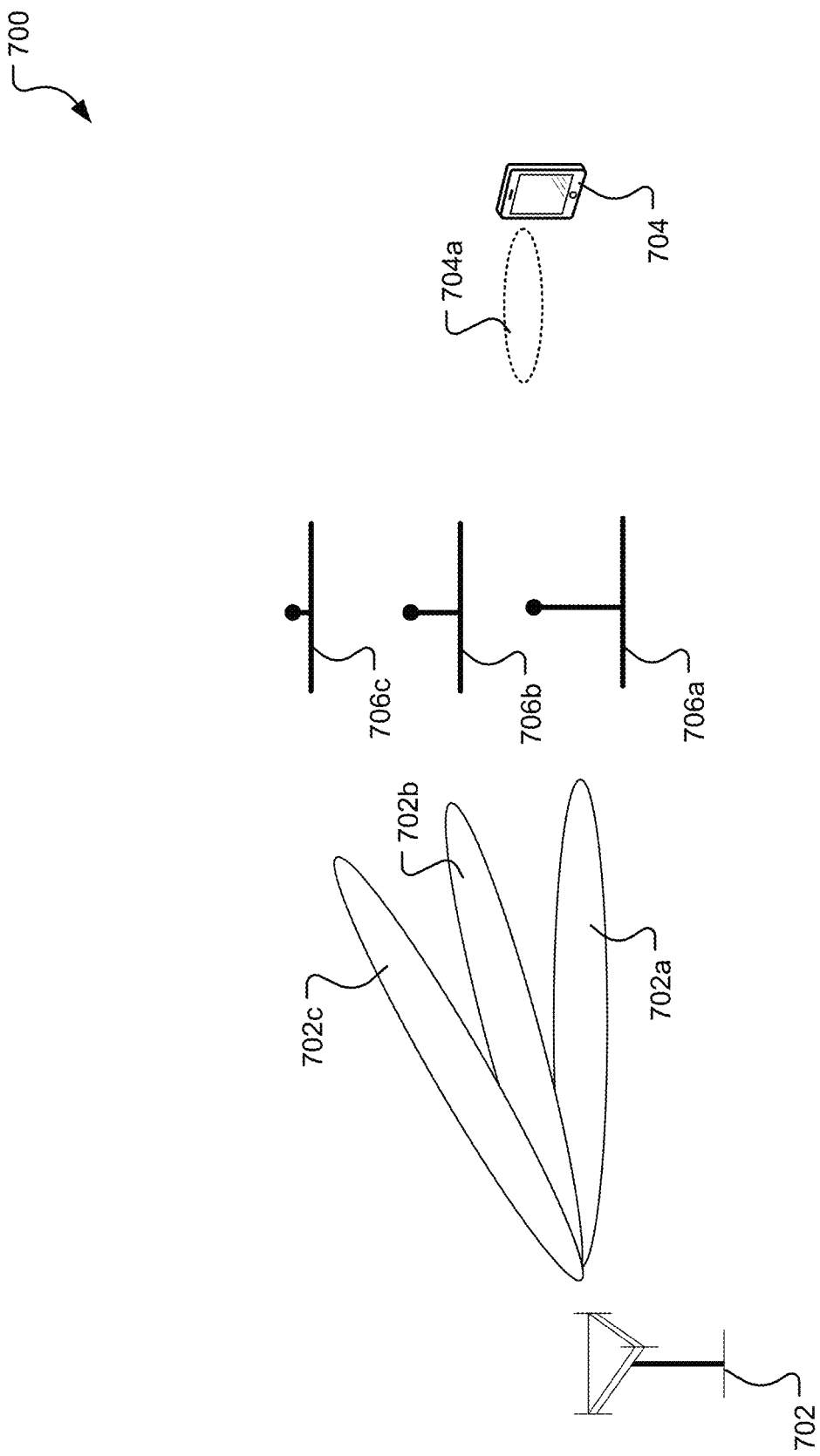
FIG. 7 includes example reference signal received power values for different radio frequency beams transmitted by a base station.

Referring to FIG. 7, a diagram 700 of example reference signal received power (RSRP) values for different radio frequency beams transmitted by a base station are shown. A base station 702 may be configured to utilize beamforming to transmit reference signals (RS) such as PRS, NRS, TRS, CRS, etc., and a mobile device, such as a UE 704, may be configured to receive and measure the reference signals. For example, the base station may transmit a first RS 702a at a first angle, a second RS 702b at a second angle, and a third RS 702c at a third angle. The angles of the RS 702a-b may be based on 3D coordinates and may include azimuth and elevation angles. In an example, the UE 704 may be configured to utilize receive beamforming and may receive the RS 702a-c with a receive beam 704a. The relative RSRPs for each of the RS 702a-c as received by the UE 704 are illustrated as graphs in the diagram 700. A first RSRP value 706a is associated with the first RS 702a, a second RSRP value 706b is associated with the second RS 702b, and a third RSRP value 706c is associated with the third RS 702c. In an example, the UE 704 may utilize the beam angle information associated with the first RS 702a (e.g., the beam with the relatively higher first RSRP value 706a) to inform the base station 702 to utilize a similar beam configuration (e.g., bearing and/or elevation) for subsequent data communications. The pMIMO surfaces described herein may be utilized to extend the capabilities of a base station to enable subsequent beam steering to the signals transmitted between the base station 702 and the UE 704.

Figure 8A:
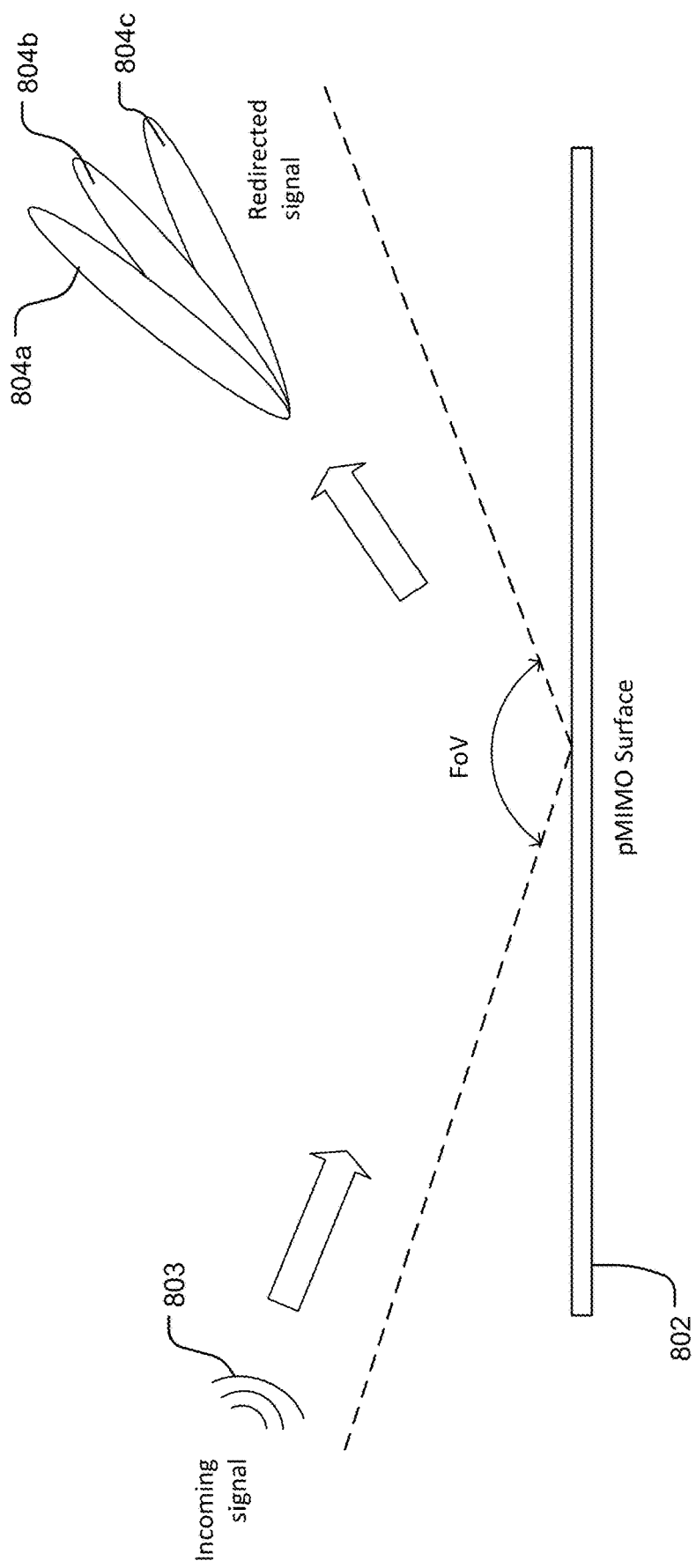
FIGS. 8A and 8B are functional diagrams of an example passive Multiple-Input Multiple-Output (pMIMO) surfaces.
Figure 8B:
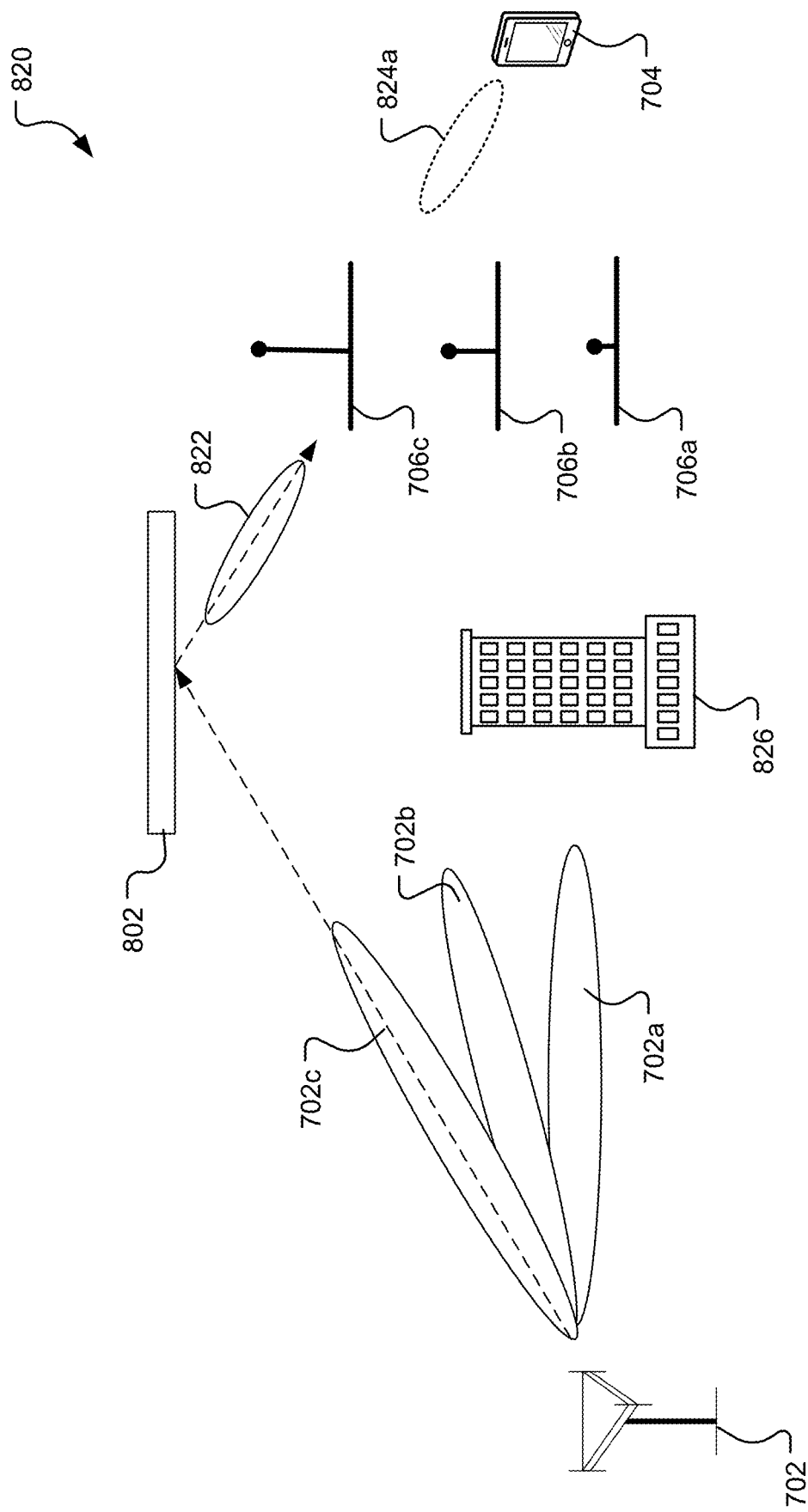

Referring to FIGS. 8A and 8B, with further reference to FIG. 7, an example pMIMO surface 802 is shown. The pMIMO surface 802 is configured to receive an arbitrary incoming signal 803 from a wireless node (e.g., a gNB, UE, RSU, AP, etc.) within a field of view (FoV) and redirect the signal toward a specified direction (e.g., to a receiving station). For example, the pMIMO surface 802 may redirect the signal 803 to form a first beam 804a in a first direction, a second beam 804b in a second direction, or a third beam 804c in a third direction. The number and directions of the beams 804a-c are examples and not limitations. Referring to FIG. 8B, in an example use case diagram 820, the pMIMO surface 802 may be used to extend the coverage of the base station when line-of-sight paths are obstructed. In this use case, a building 826 is obstructing the first RS 702a causing a reduction in the first RSRP value 706a. The pMIMO surface 802 may be located and configured to receive the third RS 702c and redirect the signal to form a redirected beam 822 based on the location of the UE 704. The third RSRP value 706c is increased based on the redirected beam 822 and the UE 704 may be configured to generate a receive beam 824a based on the bearing of the redirected beam 822. The pMIMO surface 802 may also be configured to perform reciprocal redirection such that signals transmitted from the UE 704 may be redirected towards the base station 702. In an example, the pMIMO surface 802 may be utilized to augment the positioning techniques described in FIGS. 5, 6A and 6B. For example, the location of the pMIMO surface and the corresponding AoA and AoD information may be used to determine the location of a UE. In an example, timing group information associated with a pMIMO surface may be used on time-of-flight computations for signals redirected between base stations and UEs.

Figure 9A:
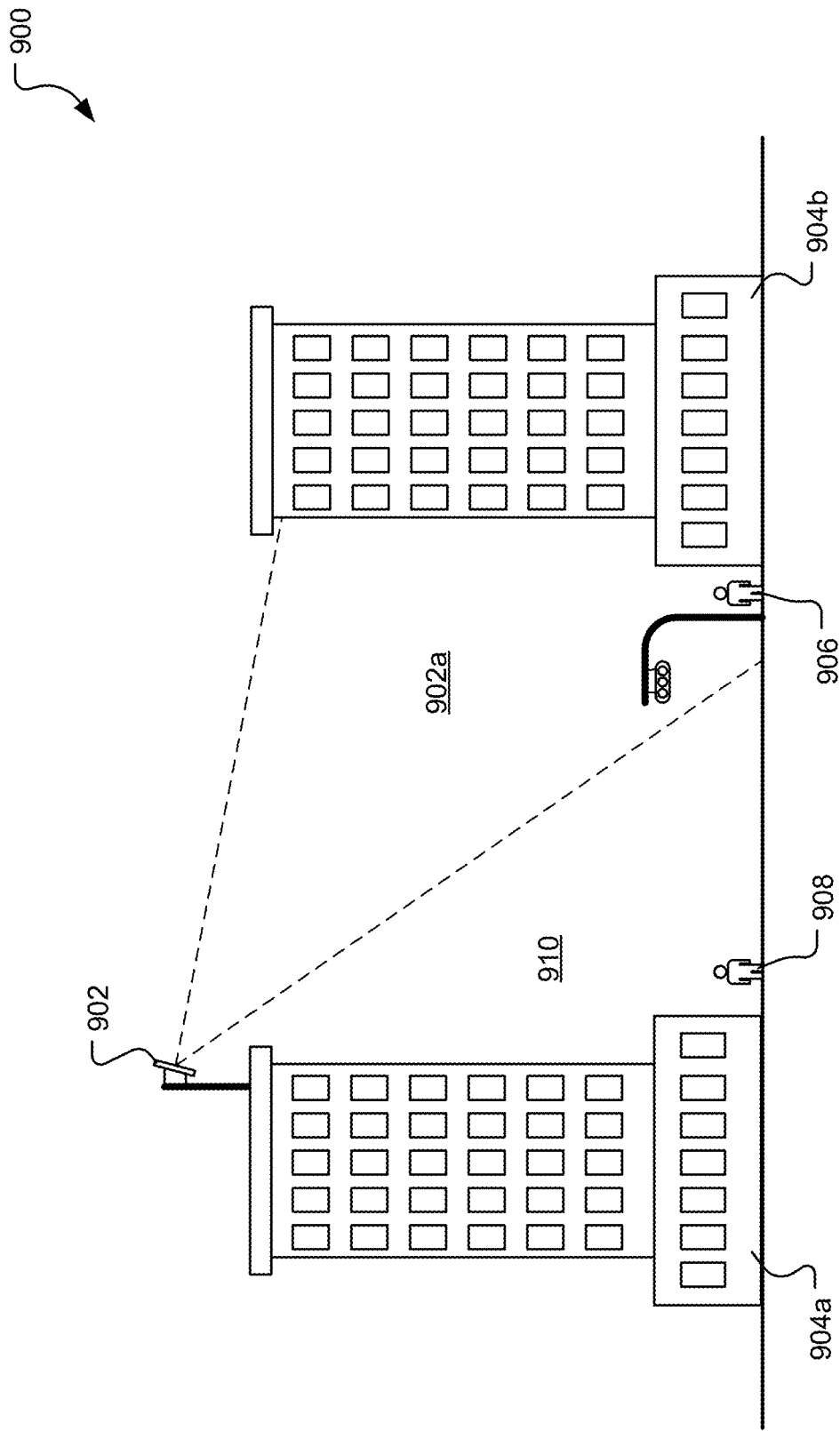
FIGS. 9A and 9B depict example use cases for pMIMO surfaces.
Figure 9B:
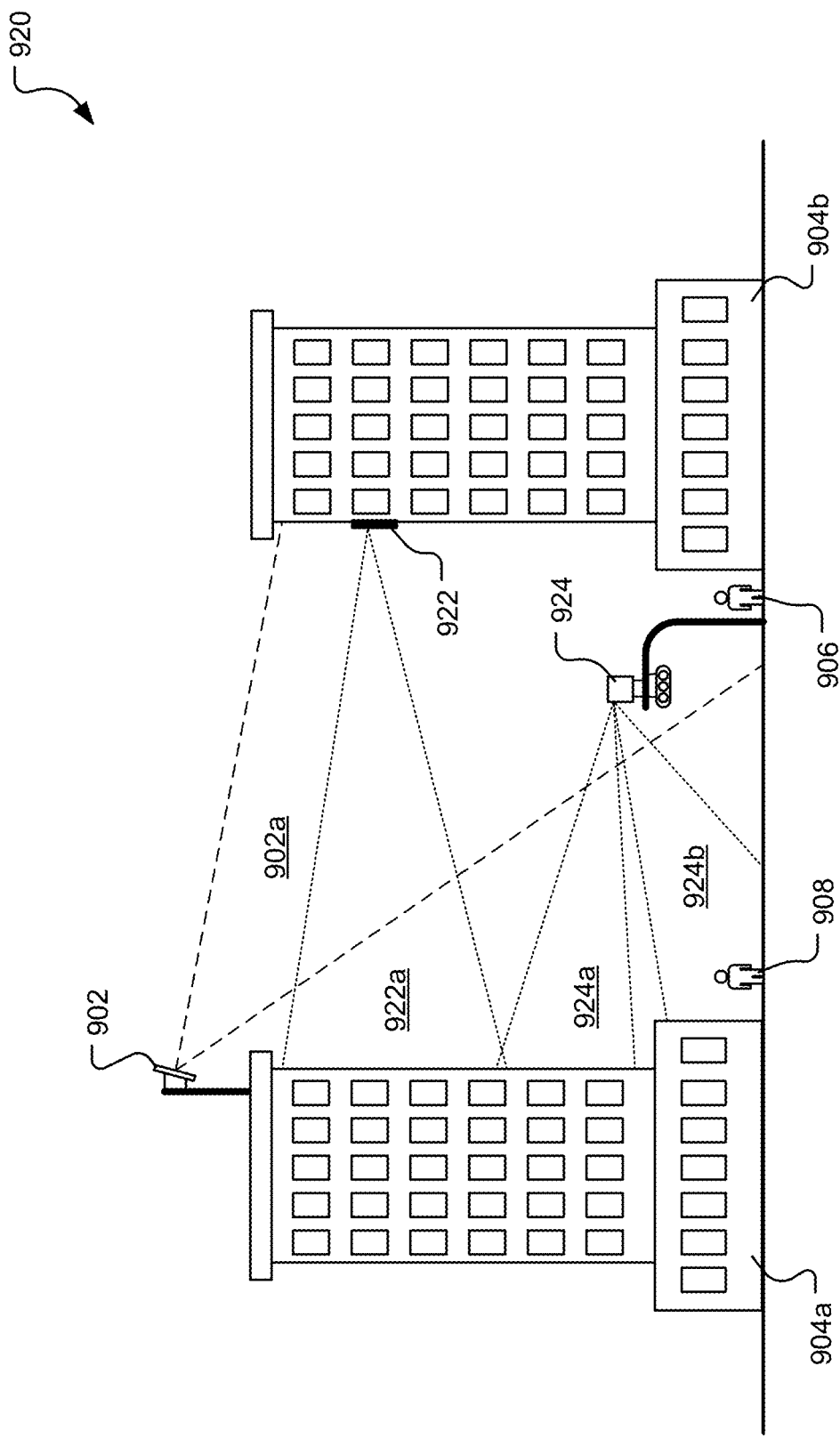

Referring to FIGS. 9A and 9B, example use cases for pMIMO surfaces are shown. A first diagram 900 depicts and urban environment (e.g., urban canyon) including a base station 902 (e.g., gNB) mounted atop a first building 904a with a first coverage area 902a. At least a portion of a second building 904b and a first user 906 are within the first coverage area 902a. A second user 908 is outside of the first coverage area 902a and within an area of no coverage (e.g., a coverage dead zone 910). The ability for a base station to cover a large area is particularly of concern for high frequency systems (e.g., mmW) because of the attenuation and reflections caused by obstructions on the high frequency signals. One or more pMIMO devices may be used to extend the coverage of the base station 902 and reduce the size of the coverage dead zone 910. For example, referring to FIG. 9B, a second diagram 920 includes a first pMIMO surface 922 installed on the second building 904b and a second pMIMO surface 924 installed on a traffic light apparatus or in other locations in the urban canyon. The first pMIMO surface 922 is configured to redirect the signals transmitted by the base station 902 into a second coverage area 922a, and the second pMIMO surface 924 is configured to redirect the signals transmitted by the base station 902 into a third coverage area 924a and a fourth coverage area 924b. The pMIMO surfaces 922, 924 are also configured for reciprocal redirections such that signals transmitted in the respective coverage areas 922a, 924a, 924b may be redirected to the base station 902. The second user 908 may establish communications with the base station 902 via the second pMIMO surface 924. As compared to repeater installations, which may also be used to increase the coverage area of a base station, the pMIMO surfaces 922, 924 may be configured to provide the same coverage at a reduced cost and while utilizing less power. In an example, the pMIMO surfaces 922, 924 may be communicatively coupled with the base station 902 (e.g., via wired or wireless protocols) such that the base station 902 may provide instructions to configure the redirection angles of the pMIMO surfaces 922, 924. The pMIMO surfaces 922, 924 may include respective controllers and power supplies configured to modify the impedance of the radiators in the pMIMO surfaces 922, 924 to control the angles of the redirected signals.

Figure 10:
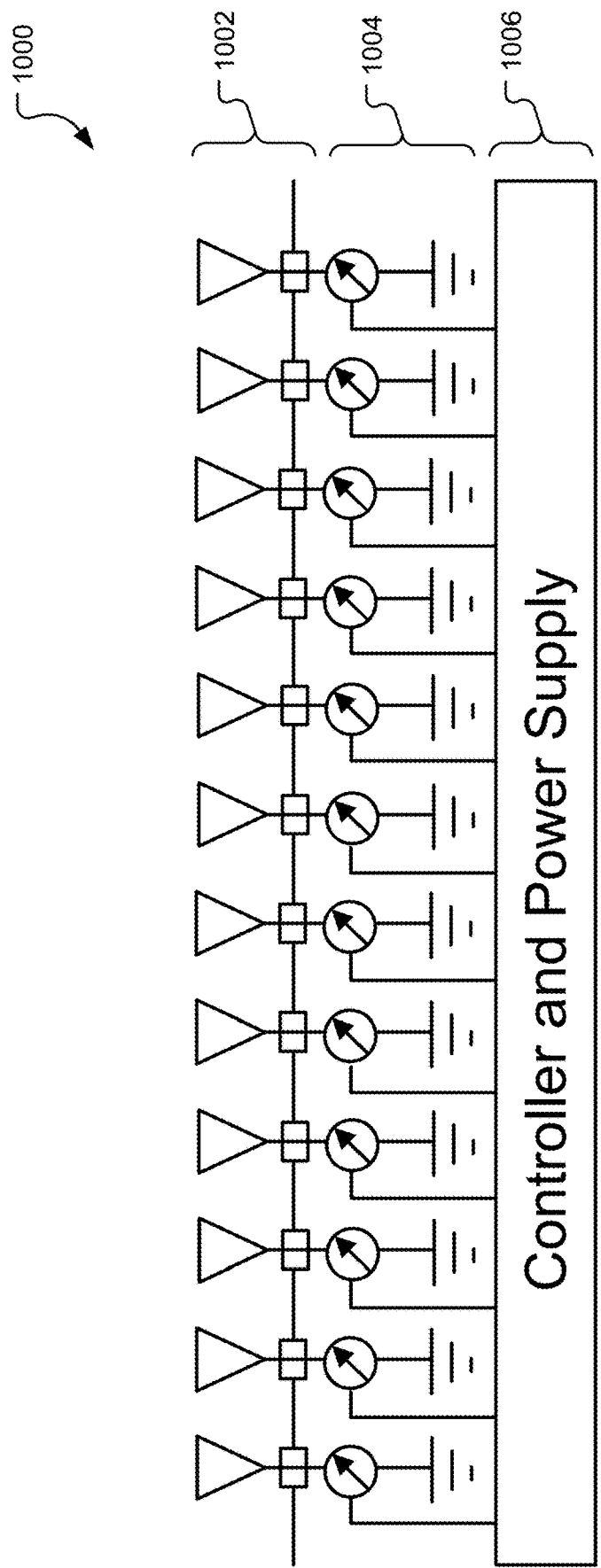
FIG. 10 is an example pMIMO hardware implementation.

Referring to FIG. 10, an example pMIMO hardware implementation 1000 is shown. A schematic diagram of the pMIMO hardware includes a plurality of radiating elements 1002, respective phase shifting components 1004, and a controller 1006 (and optionally a power supply unit). In general, the radiating elements 1002 may be similar to radiator elements used in prior active phased arrays. Other designs, such as described herein, may also be used. The selection of the radiating elements may be based on operational and manufacturing priorities such as signal performance, cost and hardware complexity. The phase shifting components 1004 may utilize 2 to 4 phase shifting components for each dual-pol radiator. Separate phase shifters for each polarization (e.g., Co-pol and cross-pol) may be required. Switchable capacitor arrays, analog varactors, switchable arrays of delay lines, switchable arrays of inductors and capacitors, and other standard phase shifting devices may be used as the phase shifting components 1004. The operating frequency band and bandwidth requirements may impact the selection of the phase shifting components. The designs described herein provide a technical advantage of reducing the number of phase shifting components per radiator. The reduction of components may reduce calibration time, cost, power consumption, and complexity of the pMIMO surfaces as compared to the designs for prior reactive surfaces.

In an example, the pMIMO hardware implementation 1000 may include, or be communicatively coupled to, one or more components of the TRP 300 to enable the pMIMO surface to communicate with a wired or wireless network. For example, the processor 310 and the transceiver 315 may be utilized to send and receive configuration and control information to other network resources such as a gNB 110a, a UE 105, and other networked servers, such as the LMF 120.

Figure 11:
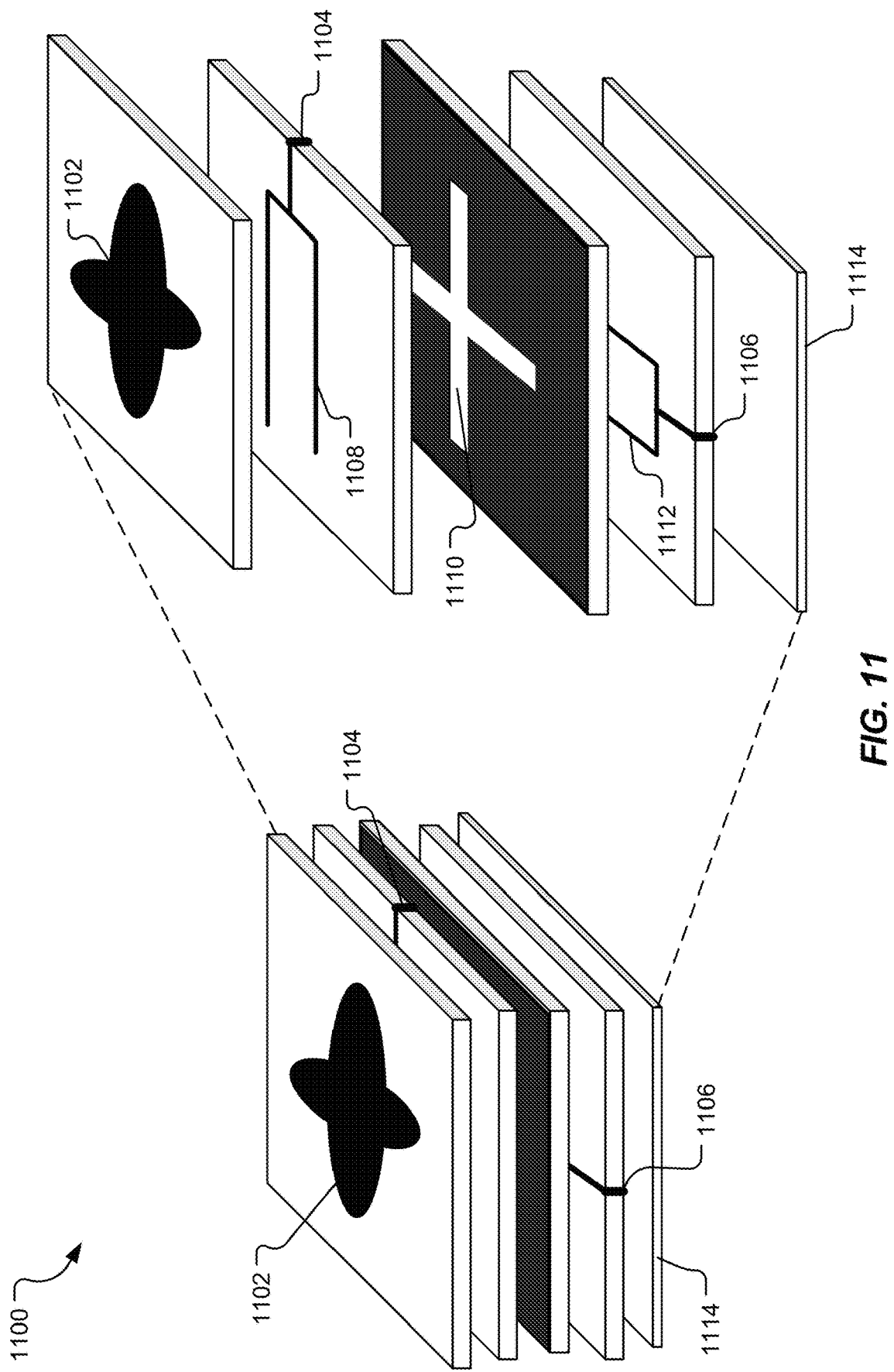
FIG. 11 is a diagram of an example dual-pol pMIMO unit cell with a aperture radiator.
Figure 13:
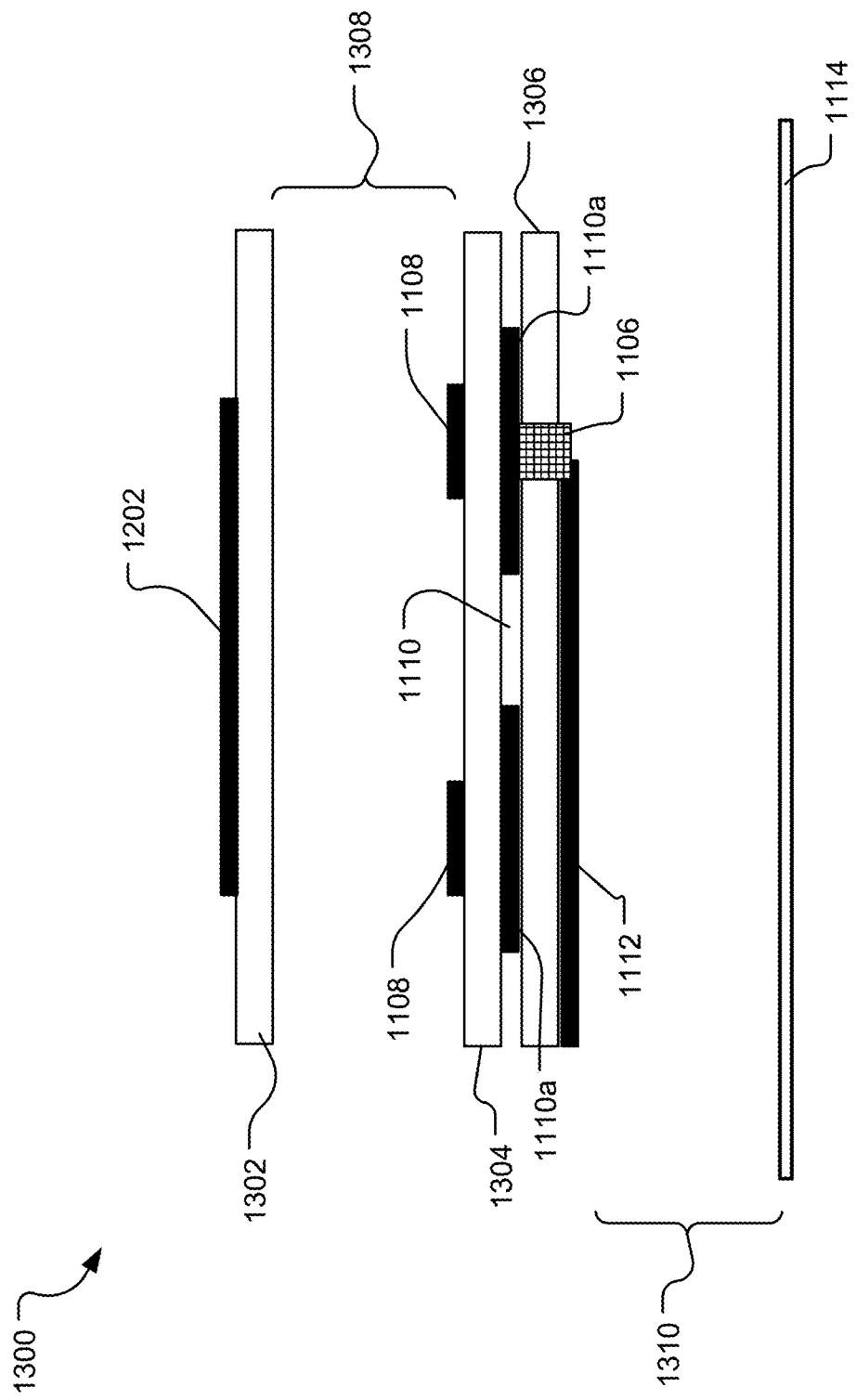
FIG. 13 is a side view diagram of an example pMIMO unit cell.

Referring to FIG. 11, a diagram of an example dual-pol pMIMO unit cell 1100 with a aperture radiator is shown. A pMIMO surface may include an array of the unit cell 1100 (e.g., 4×4, 8×8, 9×11, etc.). The unit cell 1100 is an example of a reconfigurable reflective element and includes components on different layers of a printed circuit board (PCB) or similar dielectric materials as an example to facilitate the descriptions of the components. In a manufactured device, as depicted in FIG. 13, the components may be disposed on the top or bottom of a dielectric material, and/or within layers of a PCB substrate. In an example, air gaps or other dielectric materials may be disposed between the components. The components may be disposed on the PCB material via metallization or other deposition techniques for disposing copper, silver, or other conductors on or within a PCB as known in the art. A parasitic element 1102 may be disposed above an aperture/slot type radiator 1110 for bandwidth and gain improvements. In an example, the aperture/slot type radiator 1110 may be etched in a metal layer. The combination of the aperture/slot type radiator 1110 and the parasitic element 1102 act as a combined radiating element (i.e., one of the plurality of radiating elements 1002). A first power divider 1108 and a second power divider 1112 may be disposed proximate to the aperture/slot type radiator 1110 such that the aperture/slot type radiator 1110 excites the first power divider 1108 and the second power divider 1112. The first power divider 1108 is configured for a first polarization (e.g., co-pol) and the second power divider 1112 is configured for a second polarization (e.g., cross-pol). A first phase shifting component 1104 is electrically coupled to the first power divider 1108 and a second phase shifting component 1106 is electrically coupled to the second power divider 1112. The first and second phase shifting components 1104, 1106 may be varactors, digital capacitor arrays, a switchable array of delay lines, a switchable array of inductors and capacitors, phase shifters, or other phase shifting components, and are coupled to the controller 1006. A metallic reflector 1114 may be disposed below the power dividers and the aperture/slot type radiator. The pMIMO unit cell 1100 is an example, and not a limitation, as other unit cells may be included in a pMIMO surface.

Figure 12F:
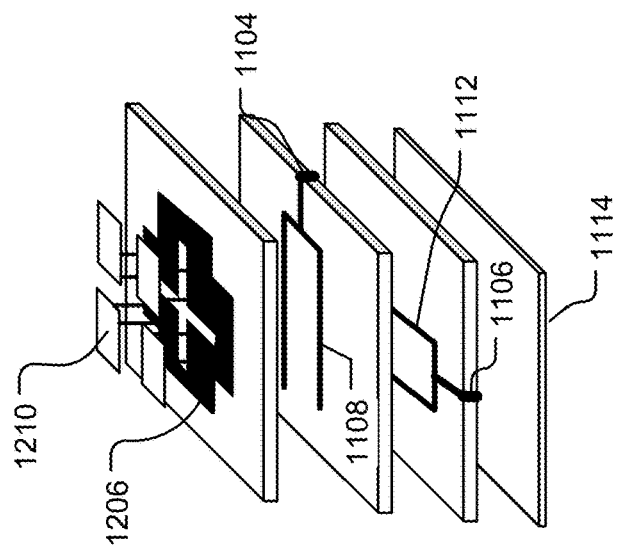
Figure 12E:
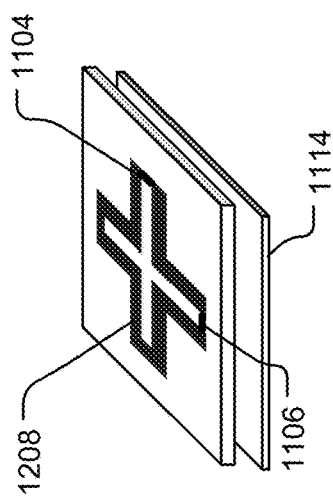
Figure 12D:
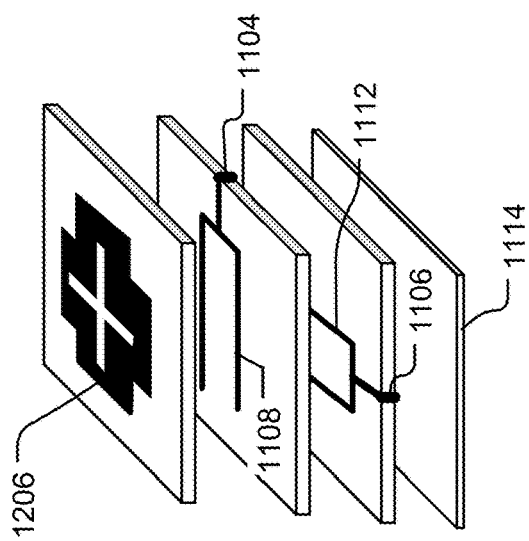

Referring to FIGS. 12A-12F, with further reference to FIG. 11, diagrams of example pMIMO design variants are shown. FIG. 12A is a slot radiator design variant without a parasitic element. FIG. 12B is a slot radiator design variant with a rectangular parasitic element 1202. FIG. 12C is a slot radiator design variant with a dielectric resonator antenna (DRA) or lens parasitic element 1204. FIG. 12D is a variation of the slot radiator configuration including a slot radiator with a finite shaped ground 1206 disposed proximate to the first and second power dividers 1108, 1112. FIG. 12E is an edge-fed slot radiator 1208 with a finite shaped ground configuration. The first and second phase shifting components 1104, 1106 are disposed across one edge of the orthogonal poles. This design utilizes one phase component for each pole which is a reduction from prior designs which utilize two phase components for each pole. FIG. 12F is a slot radiator variant with a finite shaped ground and a plurality of parasitic dipole elements 1210 electrically coupled to the finite shaped ground. The variations in FIGS. 12A-12F are examples, and not limitations, as other radiating elements may be used in a pMIMO surface.

Referring to FIG. 13, with further reference to FIGS. 11 and 12B, a side view diagram of an example pMIMO unit cell 1300 is shown. The unit cell 1300 is an example of a reconfigurable reflective element and is configured for dual polarization with 1 phase shifting component (e.g., varactor) per polarization. The unit cell includes a rectangular parasitic element 1202 disposed on a first dielectric substrate 1302. The first power divider 1108 is disposed on a second dielectric substrate 1304 and the second power divider 1112 is disposed on a third dielectric substrate 1306. The aperture/slot radiator 1110 with the aperture ground 1110a is disposed between the second substrate 1304 and the third substrate 1306 as depicted in FIG. 13. The first phase shifting component 1104 (not shown in FIG. 13) is electrically coupled to the first power divider 1108, and the second phase shifting component 1106 is electrically coupled to the second power divider 1112. A first air gap 1308 exists between the first and second dielectric substrates 1302, 1304, and a second air gap 1310 exists between the third dielectric substrate 1306 and the metallic reflector 1114. The dimensions of the unit cell 1300 may vary based on the operational frequency the pMIMO surface will be utilizing. In an example, for the n78 frequency band (i.e., 3.2-3.8 GHz) the unit cell size is approximately 39 mm by 39 mm, which is 0.45 of the wavelength at 3.5 GHz.

Figure 14A:
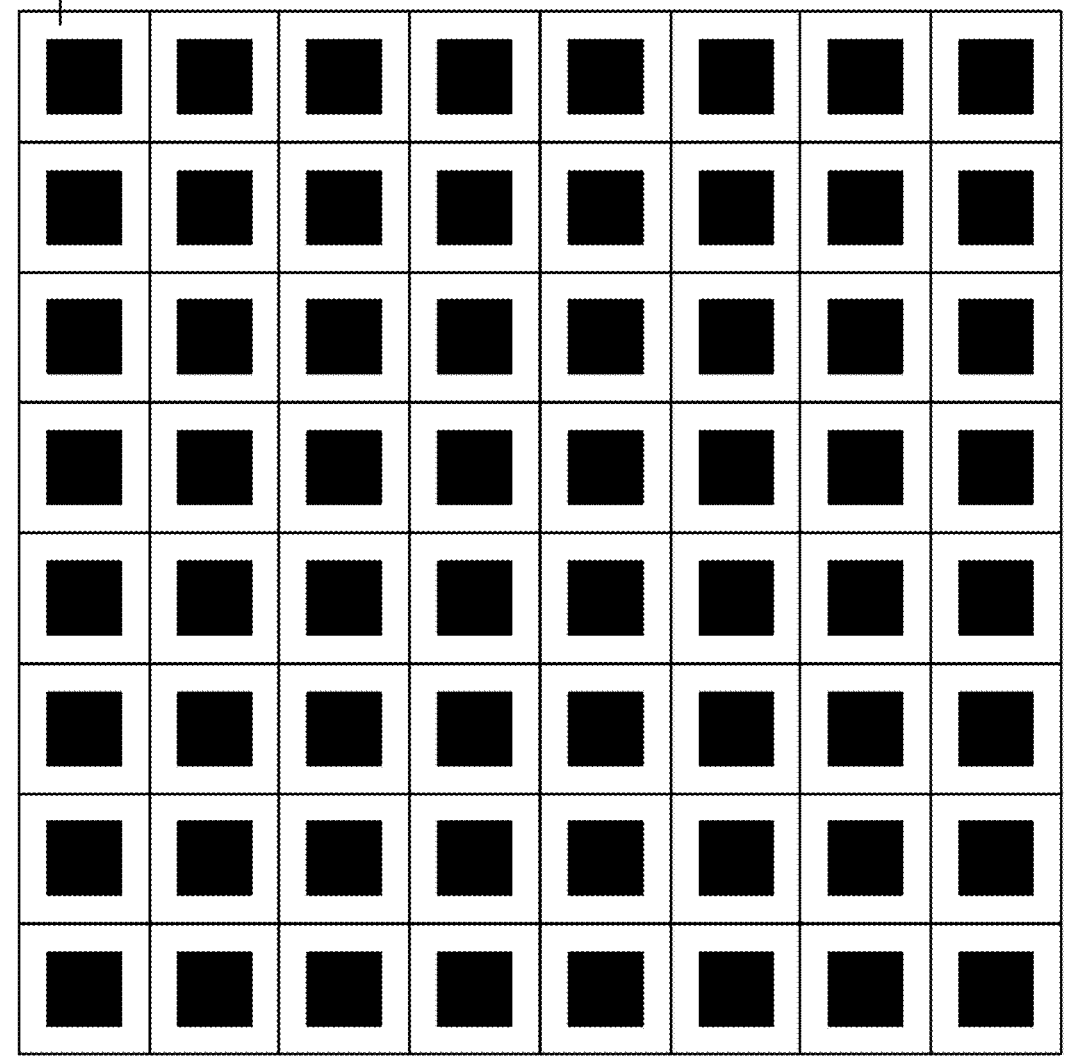
FIGS. 14A and 14B are top view diagrams of an example pMIMO surfaces with a plurality of unit cells.
Figure 14B:
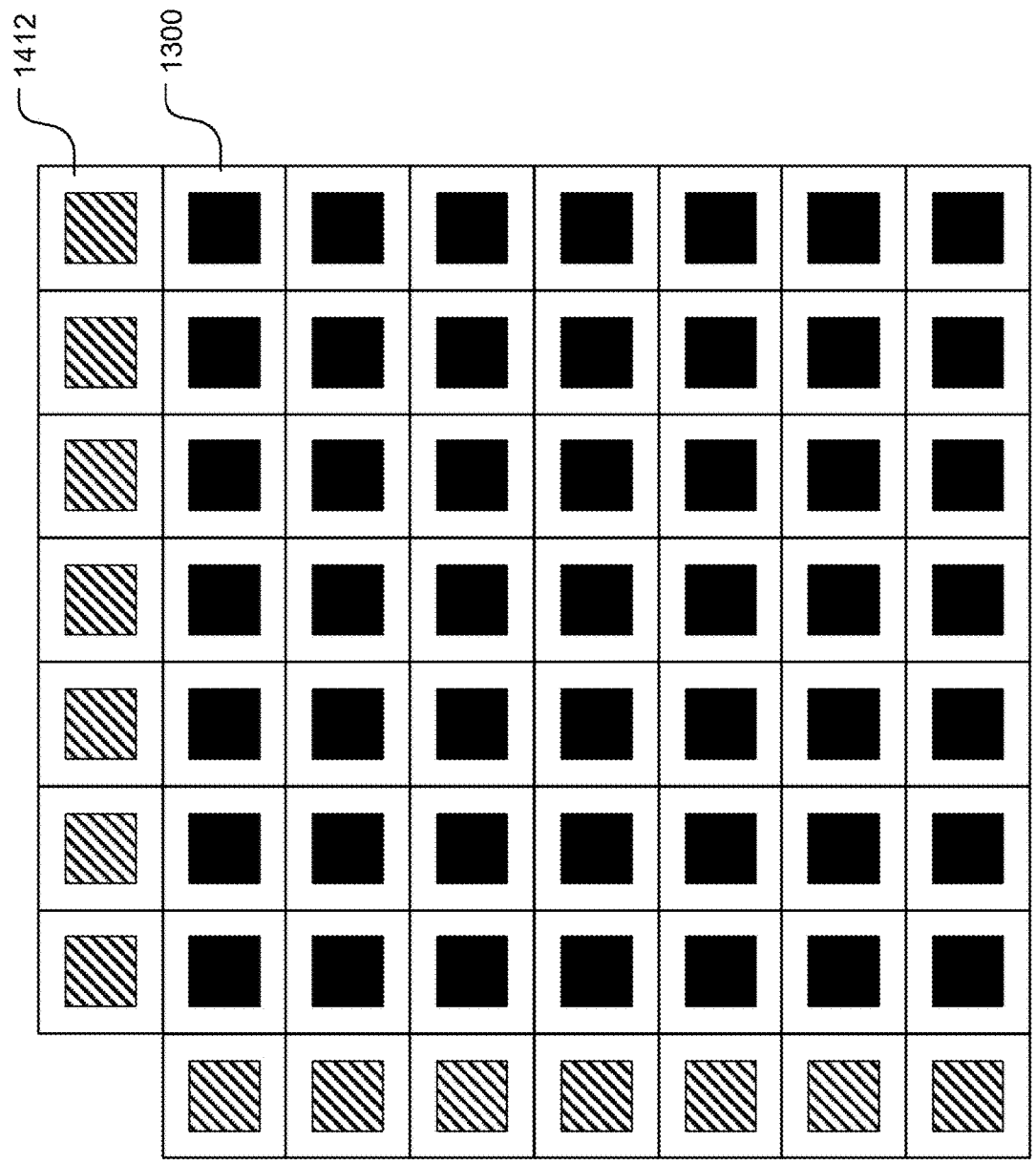

Referring to FIG. 14A and FIG. 14B, example pMIMO surfaces 1400 and 1410 may each include a plurality of unit cells 1300 assembled into an array with each of the respective phase shifting components coupled to the controller 1006. The example pMIMO surface 1410 may also include a plurality of Direction of Arrival (DoA) arrays 1412 configured to detect the direction of incoming beams. In an example, DoA arrays 1412 may include a plurality of unit cells 1300 operationally coupled to the controller 1006. The controller 1006 may be configured to detect the phase differences of received signals across the unit cells in the DoA arrays 1412 and compute the respective azimuth and elevation angles of the received signals. The DoA arrays 1412 may provide a technical improvement of decreasing the time required for the pMIMO surface 1410 to acquire a beam as compared to surfaces without the DoA arrays 1412. The dimensions of an array may be based on the operational and other physical requirements (e.g., gain, incident and reflected angle resolution, installation site, power requirements, etc.). In general, larger arrays will have increased gain and angle resolution as compared to smaller arrays. The pMIMO surface 1400 includes an 8×8 array of reconfigurable reflective elements such as the unit cells 1300 and may be configured for dual-polarization. Performance results for the pMIMO surface 1400 based on a 3.5 GHz signal received at incident angles of 0°, −60° with normal polarization, and −60° with parallel polarization are provided in the following response curves. Response curves of reflected signals at 0°, 15°, 30°, and 60° were generated and are included in FIGS. 15A-15C. The bandwidth response is provided at FIGS. 16A and 16B. The response curves in FIGS. 15A-15C and 16A-16C are examples, and not limitations, as other pMIMO surfaces may have different signal strengths and different angle performance.

Figure 15A:
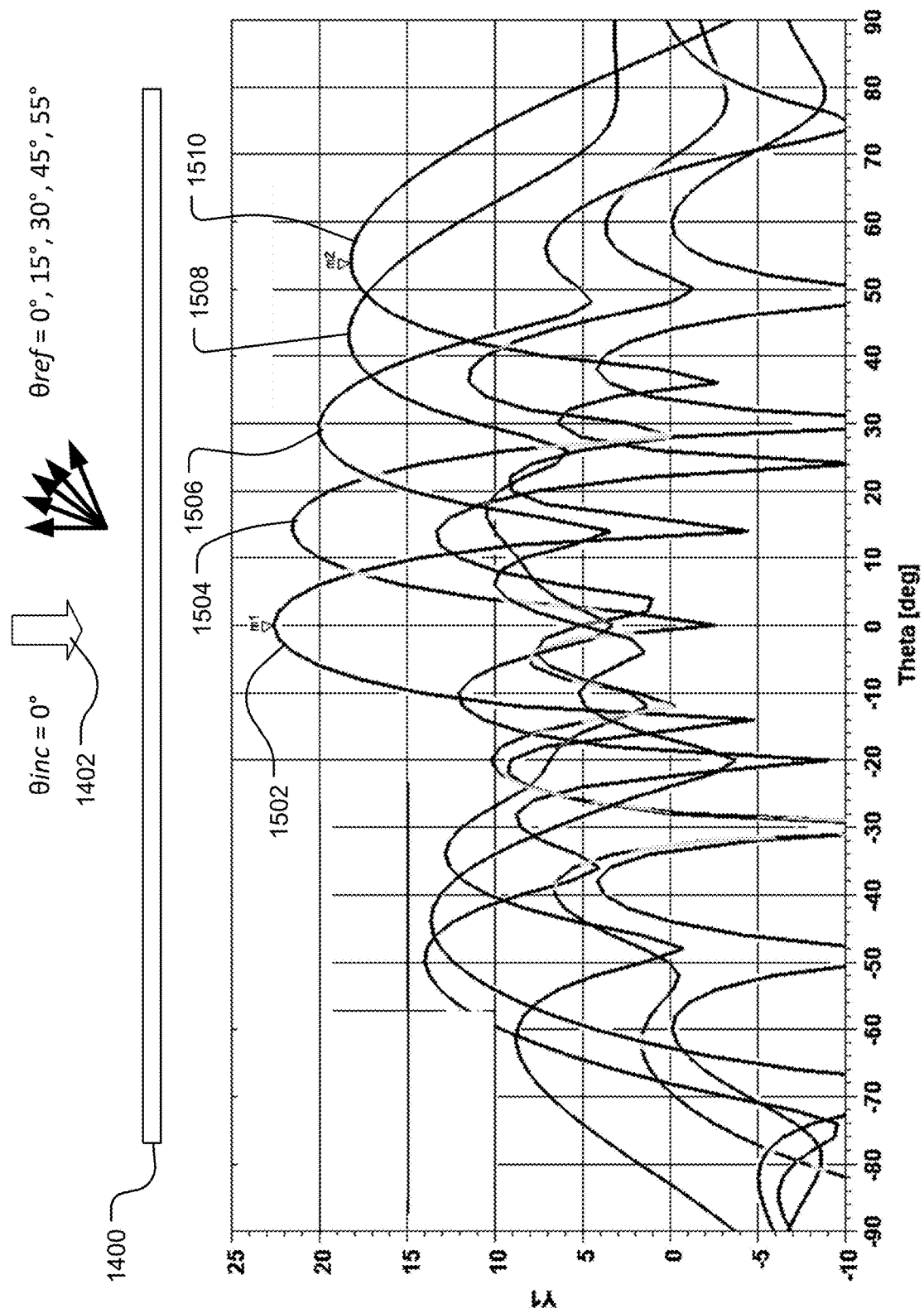
FIGS. 15A-15C are example angle response curves for a pMIMO surface.

FIG. 15A includes the response curves for an incident angle 1402 of 0° on the pMIMO surface 1400, and the corresponding signal strengths (in dB) at antenna port Y1 when the pMIMO surface 1400 is configured to reflect the received signal at 0°, 15°, 30°, 45° and 55°. A first curve 1502 includes a signal peak at 0° when the pMIMO surface 1400 is configured to reflect at 0°. A second curve 1504 includes a signal peak at 15° when the pMIMO surface 1400 is configured to reflect at 15°. A third curve 1506 includes a signal peak at 30° when the pMIMO surface 1400 is configured to reflect at 30°. A fourth curve 1508 includes a signal peak at 45° when the pMIMO surface 1400 is configured to reflect at 45°. A fifth curve 1510 includes a signal peak at 55° when the pMIMO surface is configured to reflect at 55°.

Figure 15B:
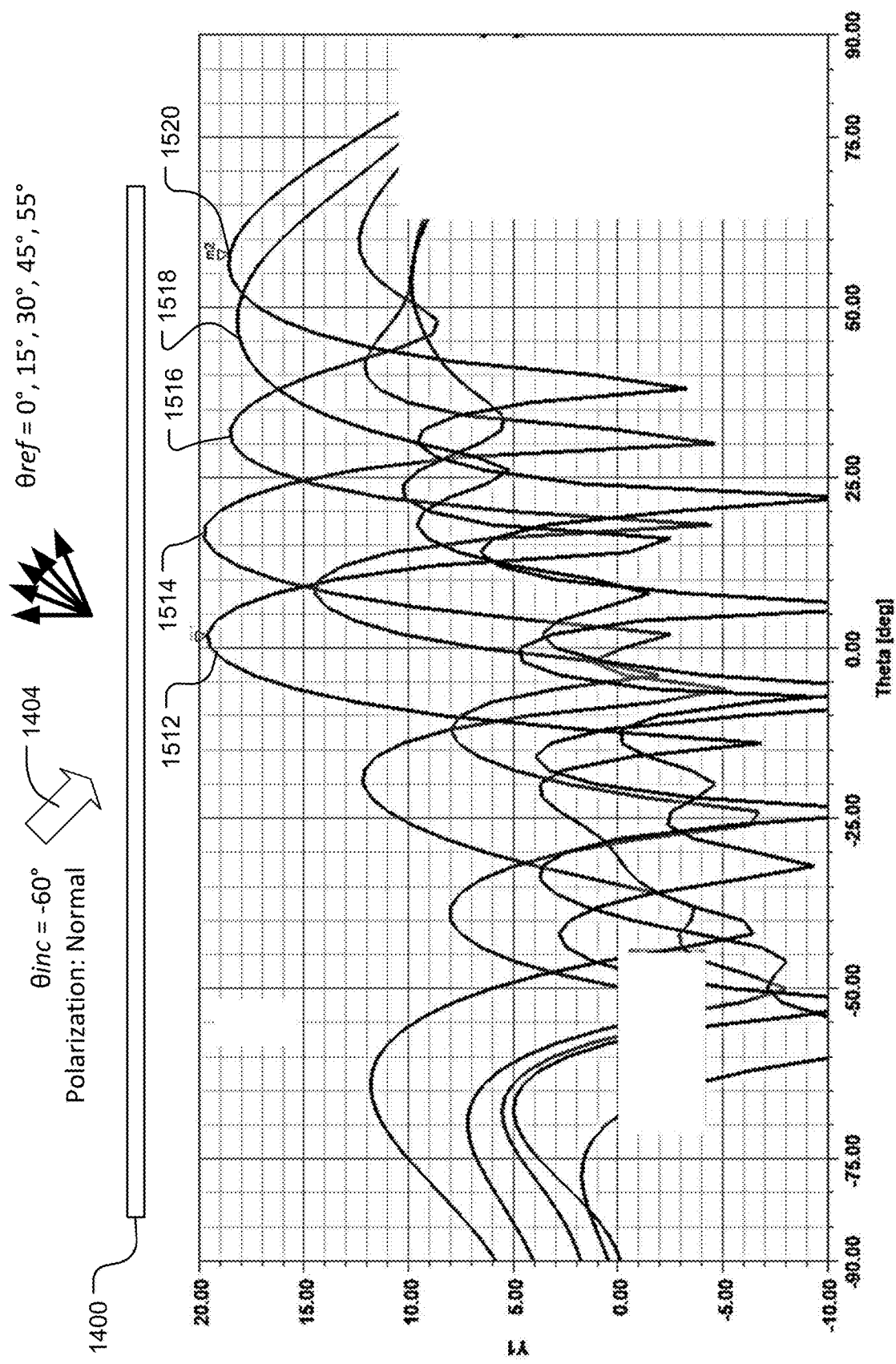

FIG. 15B includes the response curves for an incident angle 1404 of −60° with normal polarization on the pMIMO surface 1400, and the corresponding signal strengths (in dB) at antenna port Y1 when the pMIMO surface 1400 is configured to reflect the received signal at 0°, 15°, 30°, and 55°. A first curve 1512 includes a signal peak at 0° when the pMIMO surface 1400 is configured to reflect at 0°. A second curve 1514 includes a signal peak at 15° when the pMIMO surface 1400 is configured to reflect at 15°. A third curve 1516 includes a signal peak at 30° when the pMIMO surface 1400 is configured to reflect at 30°. A fourth curve 1518 includes a signal peak at approximately 45° when the pMIMO surface 1400 is configured to reflect at 45°. A fifth curve 1520 includes a signal peak at approximately 55° when the pMIMO surface 1400 is configured to reflect at 55°.

Figure 15C:
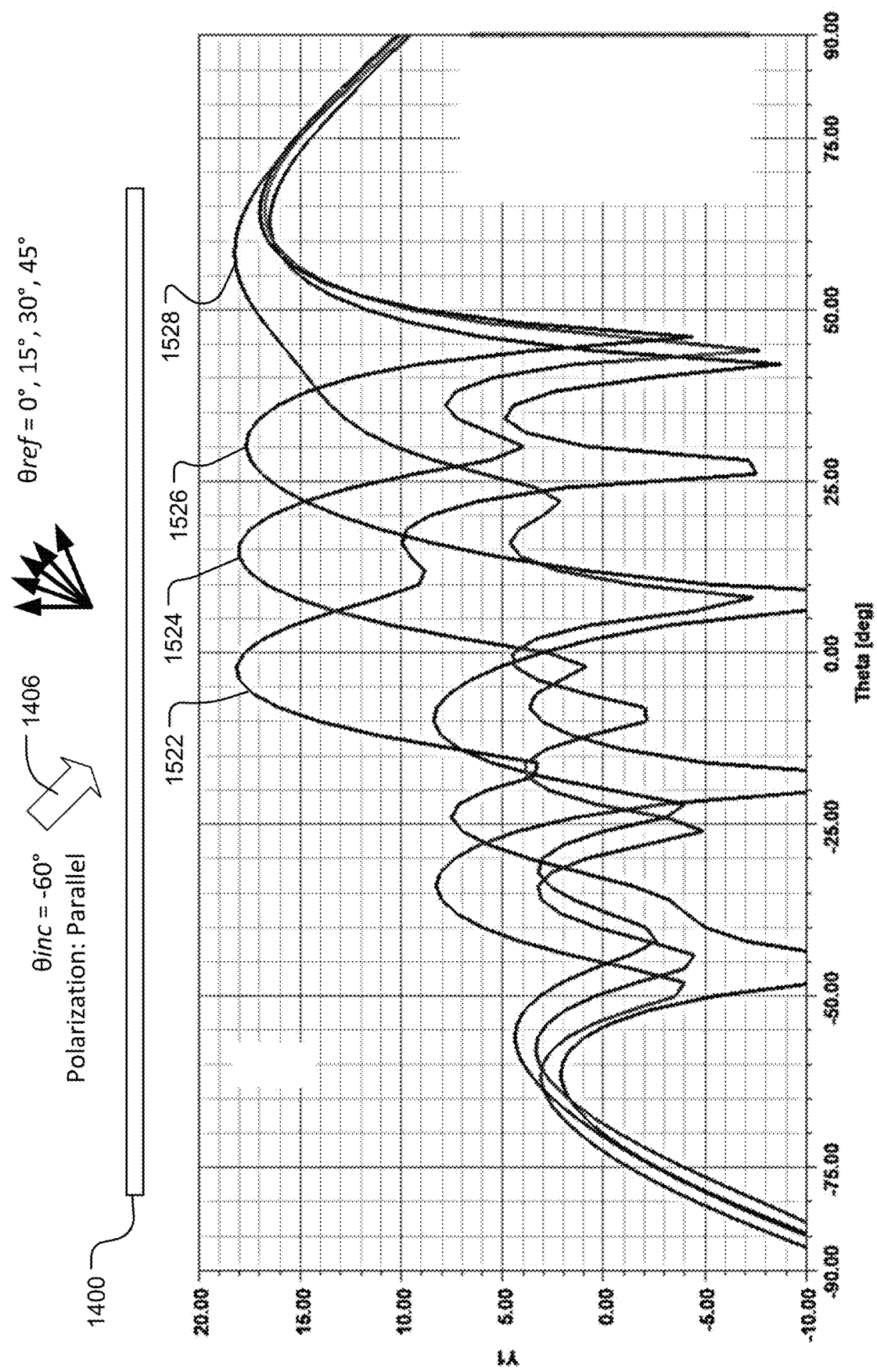

FIG. 15C includes the response curves for incident angle 1406 of −60° with parallel polarization on the pMIMO surface 1400, and the corresponding signal strengths (in dB) at antenna port Y1 when the pMIMO surface 1400 is configured to reflect the received signal at 0°, 15°, 30°, and 45°. A first curve 1522 includes a signal peak at approximately −2.5° when the pMIMO surface 1400 is configured to reflect at 0°. A second curve 1524 includes a signal peak at 15° when the pMIMO surface 1400 is configured to reflect at 15°. A third curve 1526 includes a signal peak at when the pMIMO surface 1400 is configured to reflect at 30°. A fourth curve 1528 includes a signal peak at approximately 57° when the pMIMO surface 1400 is configured to reflect at 45°.

Figure 16A:
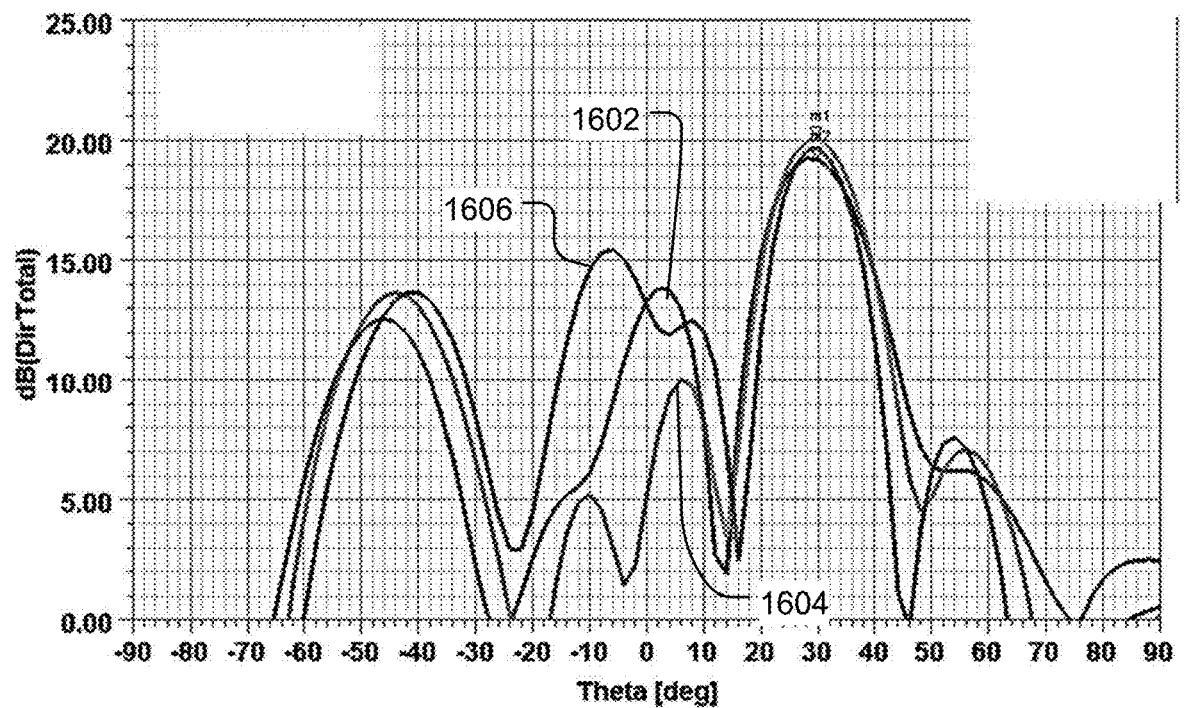
FIG. 16A-16B are example angle and bandwidth plots for a pMIMO surface.
Figure 16B:
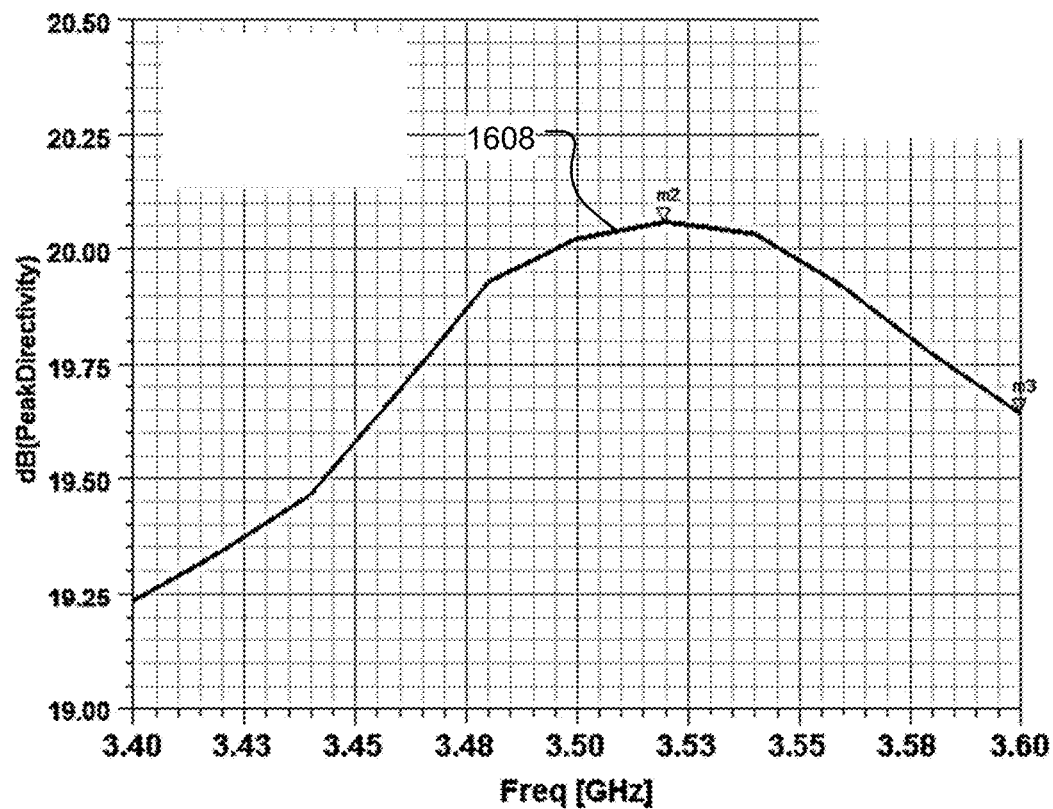

FIG. 16A includes the response curves for an incident angle 1402 of 0° on the pMIMO surface 1400, and the corresponding signal strengths (in dB) at antenna port Y1 when the pMIMO surface 1400 is configured to reflect the received signal at 30°, and the frequency is varied from 3.4 GHz to 3.6 GHz. A first curve 1602 includes a signal peak at 30° when the pMIMO surface 1400 is configured to reflect at 30° and the input signal is 3.4 GHz. A second curve 1604 includes a signal peak at 30° when the pMIMO surface 1400 is configured to reflect at 30° and the input signal is 3.5 GHz. A third curve 1606 includes a signal peak at 30° when the pMIMO surface 1400 is configured to reflect at 30° and the input signal is 3.6 GHz. FIG. 16B includes a fourth curve 1608 indicating the maximum directivity as a function of frequency as the frequency of the incident beam (at 0°) is swept from 3.4 GHz to 3.6 GHz. The fourth curve 1608 indicates a 0.8 dB gain variation over a 200 MHz bandwidth. The response curves in FIGS. 16A and 16B are examples of performance, and not limitations, as other pMIMO configurations, incident angles and frequencies may have different responses.

Figure 17:
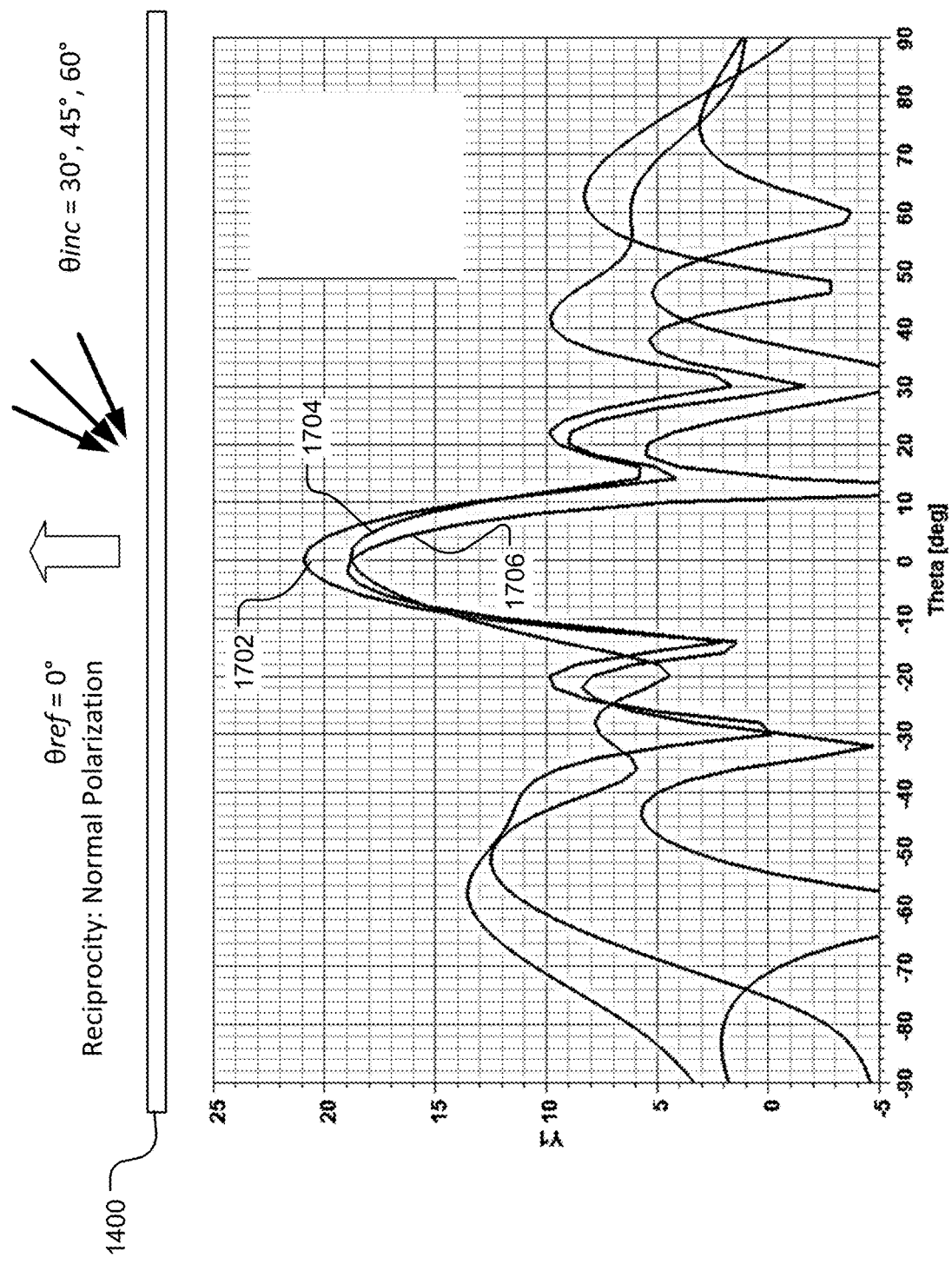
FIG. 17 are an example angle response curves for reciprocal signals impacting a pMIMO surface.

Referring to FIG. 17, example angle response curves for reciprocal signals impacting the pMIMO surface 1400 are shown. FIG. 17 includes the response curves for incident angles of 30°, and 60° on the pMIMO surface 1400, and the corresponding signal strengths (in dB) at antenna port Y1 when the pMIMO surface 1400 is configured to reflect the received signal to 0°. A first curve 1702 includes a signal peak at 0° when the pMIMO surface 1400 is configured to reflect a signal received at a 30° incident angle to the 0° angle. A second curve 1704 includes a signal peak at 0° when the pMIMO surface 1400 is configured to reflect a signal received at a 45° incident angle to the 0° angle. A third curve 1706 includes a signal peak at 0° when the pMIMO surface 1400 is configured to reflect a signal received at a 60° incident angle to the 0° angle. The reciprocal performance allows the pMIMO surface 1400 to be utilized in two-way communications and signaling between a base station (e.g., gNB) and a UE.

Figure 18:
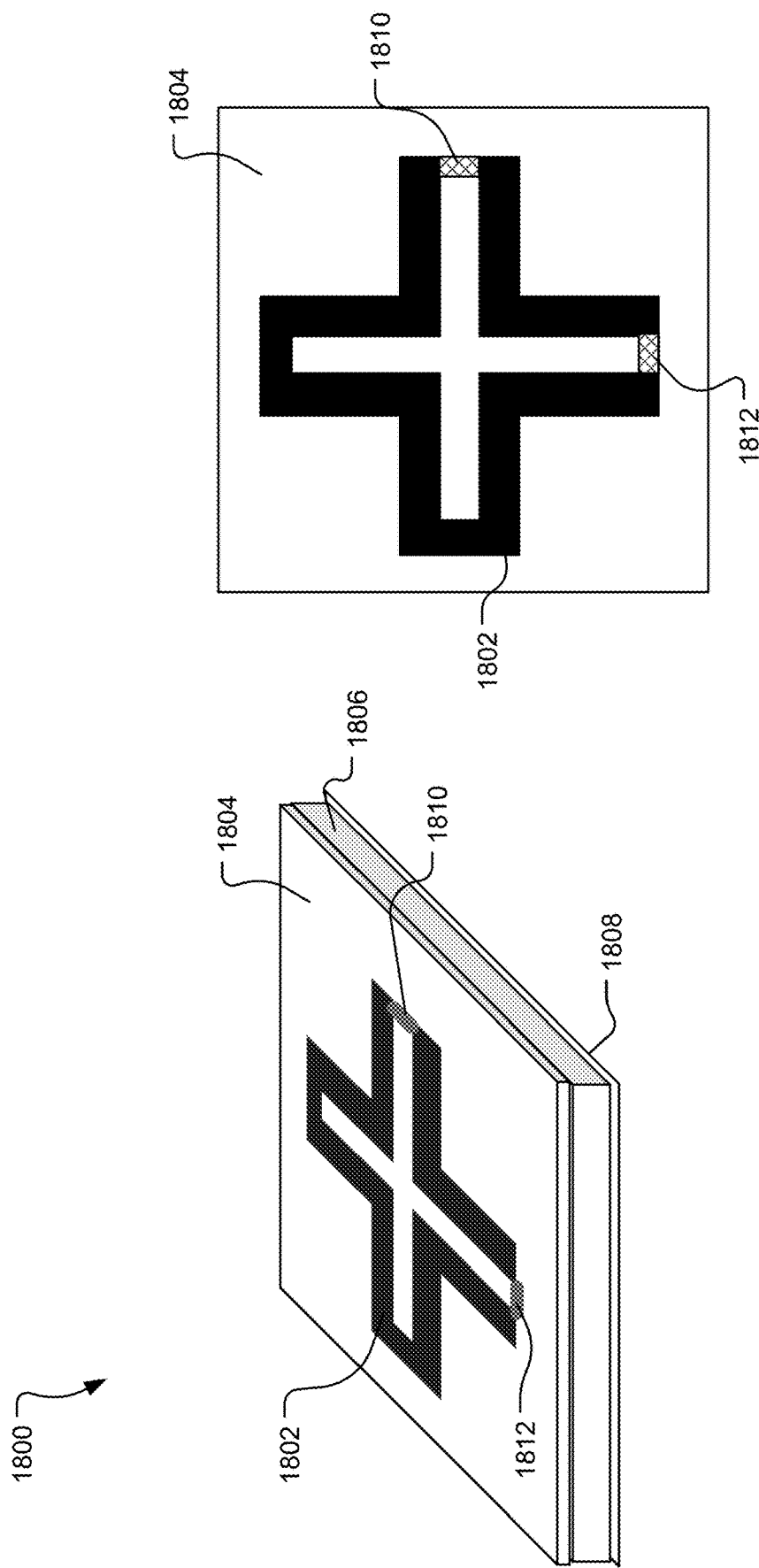
FIG. 18 includes perspective and top view diagrams of an example dual-pol cross-slot pMIMO unit cell without a parasitic element.
Figure 19:
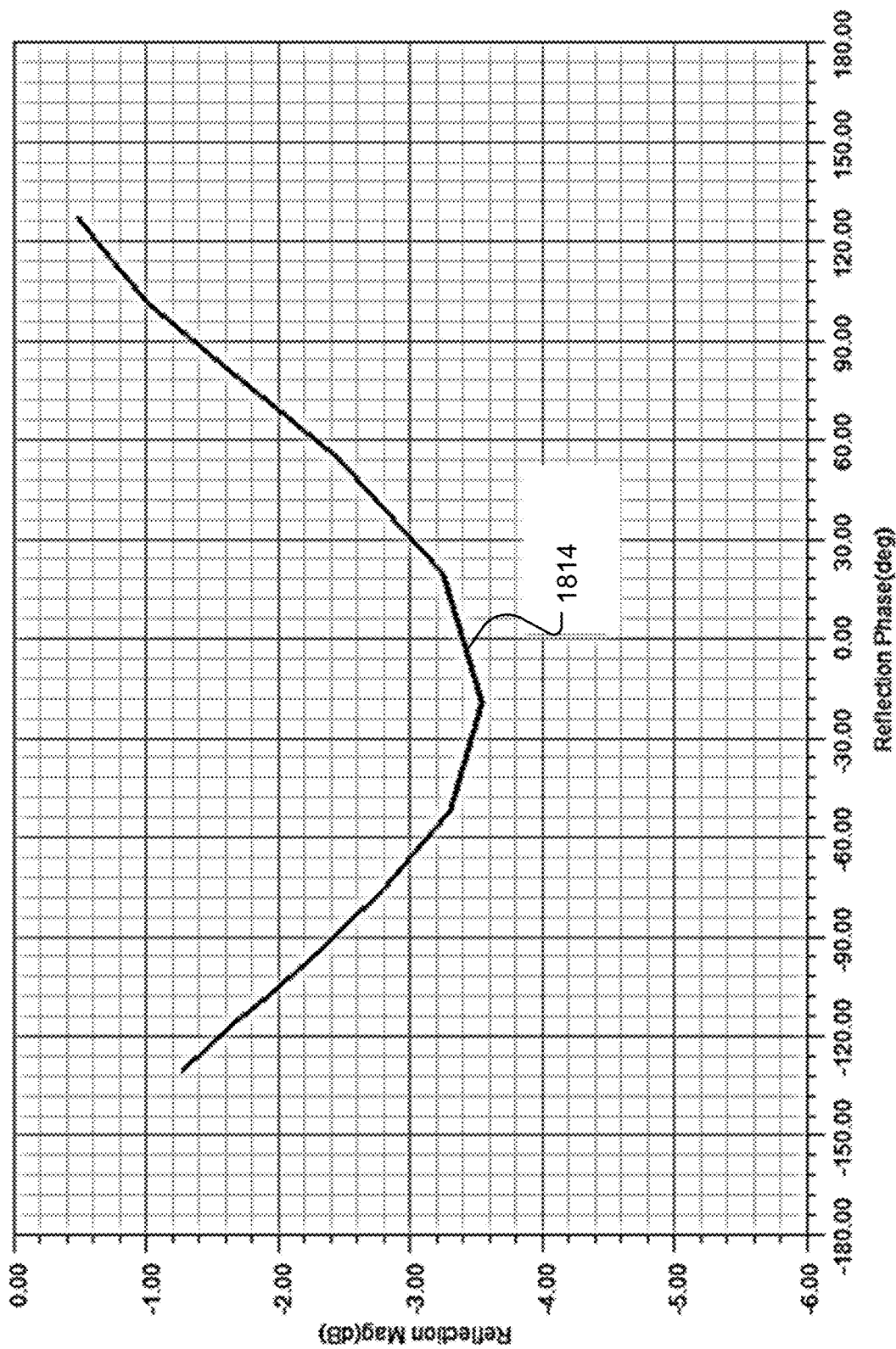
FIG. 19 is a unit cell reflection response for the pMIMO unit cell in FIG. 18.

Referring to FIG. 18, perspective view and top view diagrams of an example dual-pol cross-slot pMIMO unit cell 1800 without a parasitic element is shown. The unit cell 1800 includes a metallic cross-slot 1802 disposed on a dielectric substrate 1804, such as a printed wiring board (PWB). For example, the dielectric substrate 1804 may be 0.8 mm FR4 material disposed on 3.0 mm of dielectric foam 1806. A metallic ground layer 1808 may be disposed below the dielectric foam 1806. The unit cell includes two varactor diodes which are coupled to the controller 1006 (not shown in FIG. 18). The unit cell 1800 includes a first varactor diode 1810 disposed across a first end of the cross-slot 1802 that is utilized to control x-polarization, and a second varactor diode 1812 disposed across a second end of the cross-slot 1802 that is utilized to control the y-polarization. The unit cell 1800 provides the technical advantage of utilizing a single phase control element (e.g., the varactor diodes 1810, 1812) for each polarization. The dimensions of the unit cell 1800, the cross-slot 1802, and the ratings of the varactor diodes may vary based on the operational frequency. In general, the length of the unit cell 1800 may be approximately 0.42 of the frequency wavelength. For example, the unit cell 1800 is a square with each side of 36 mm for a 3.5 GHz operational frequency. Each of the first and second varactor diodes 1810, 1812 may have capacitance values in the range of 0.5 picofarads (pF) to 1.5 pF. In an example, referring to FIG. 19, a unit cell reflection response curve 1814 illustrates that the unit cell 1800 is capable of inducing over 200 degrees of phase change over the operational range of the varactor diodes 1810, 1812.

Figure 20A:
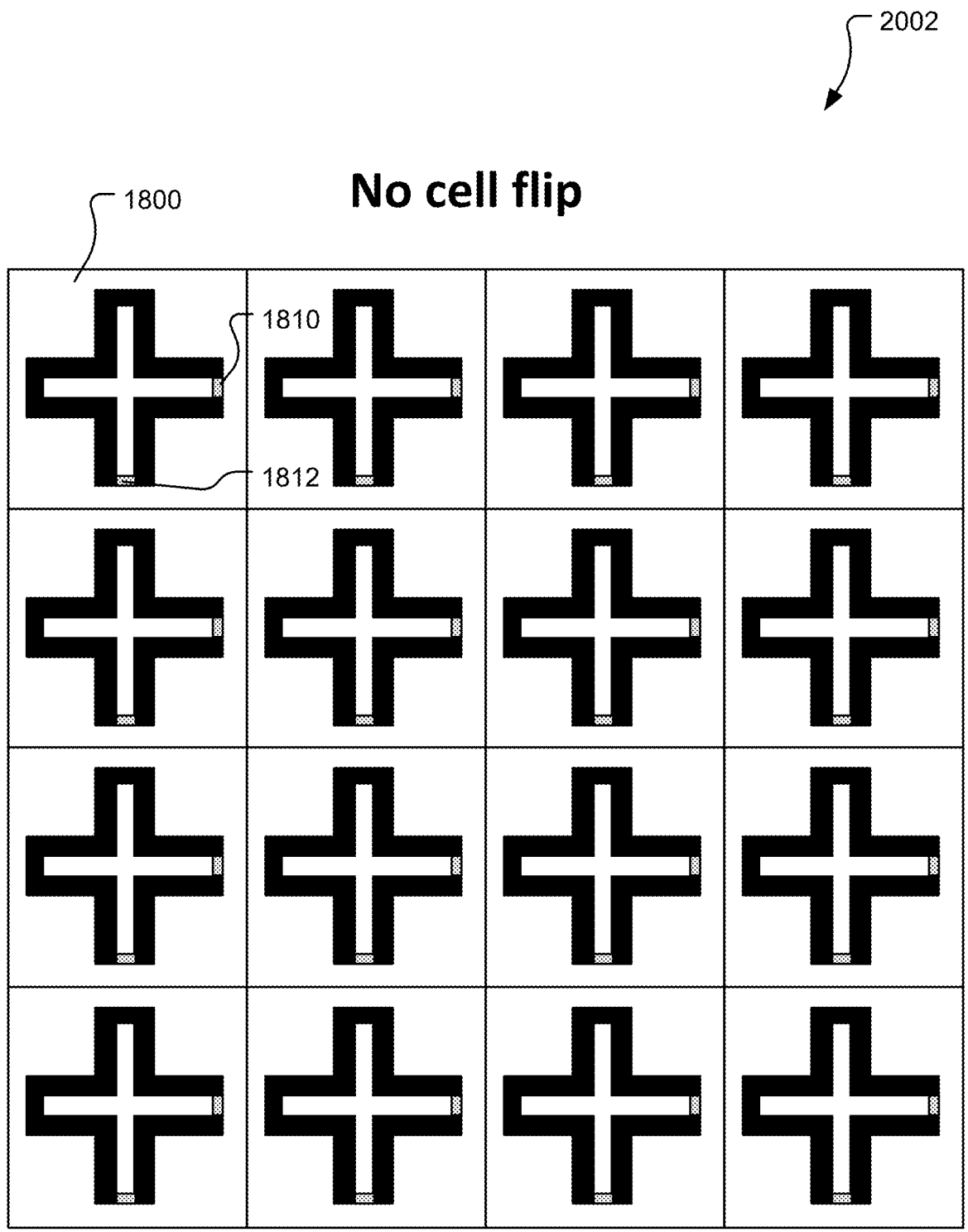
FIGS. 20A-20C are example pMIMO surfaces with variations of unit cell orientations.
Figure 20B:
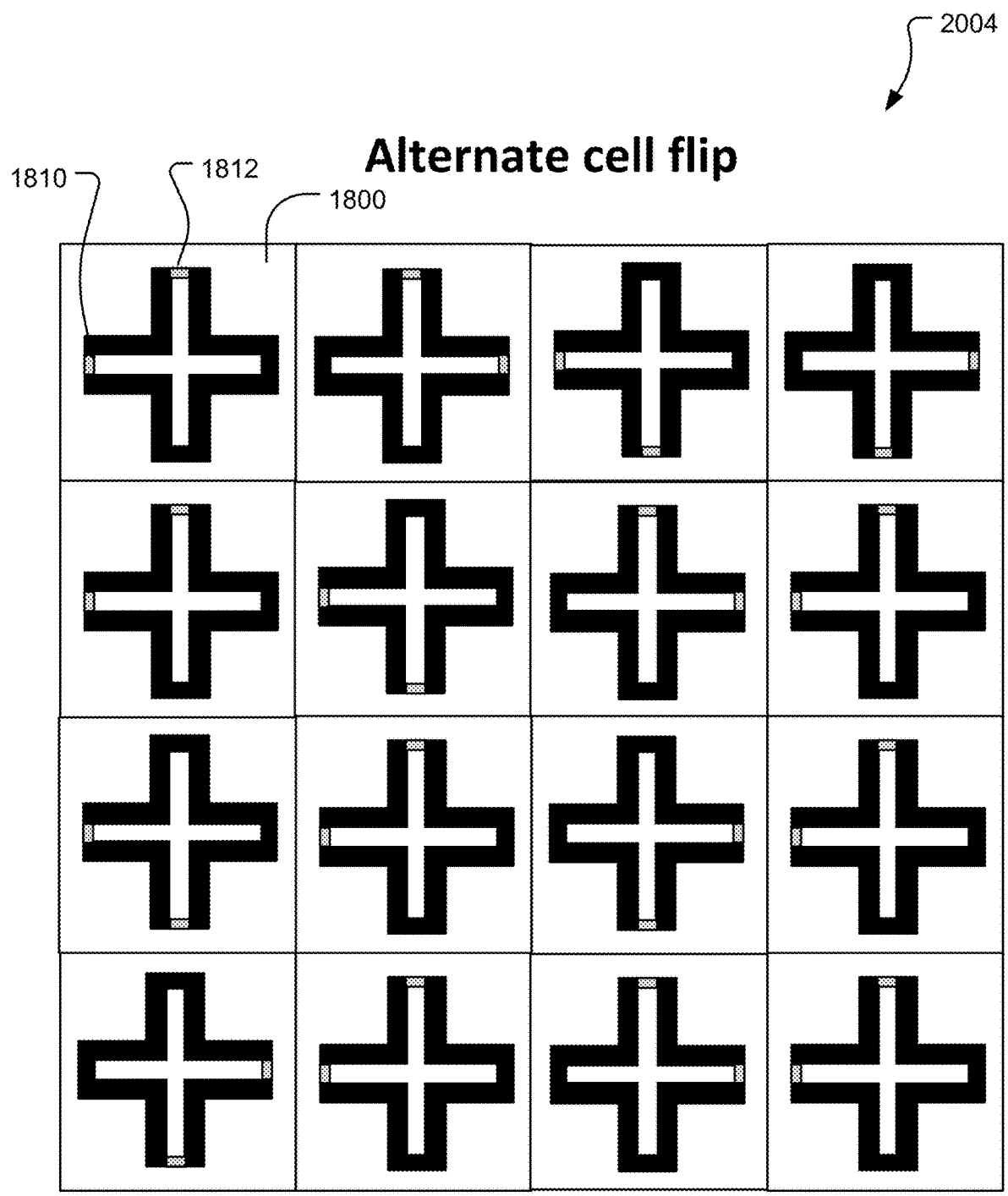
Figure 20C:
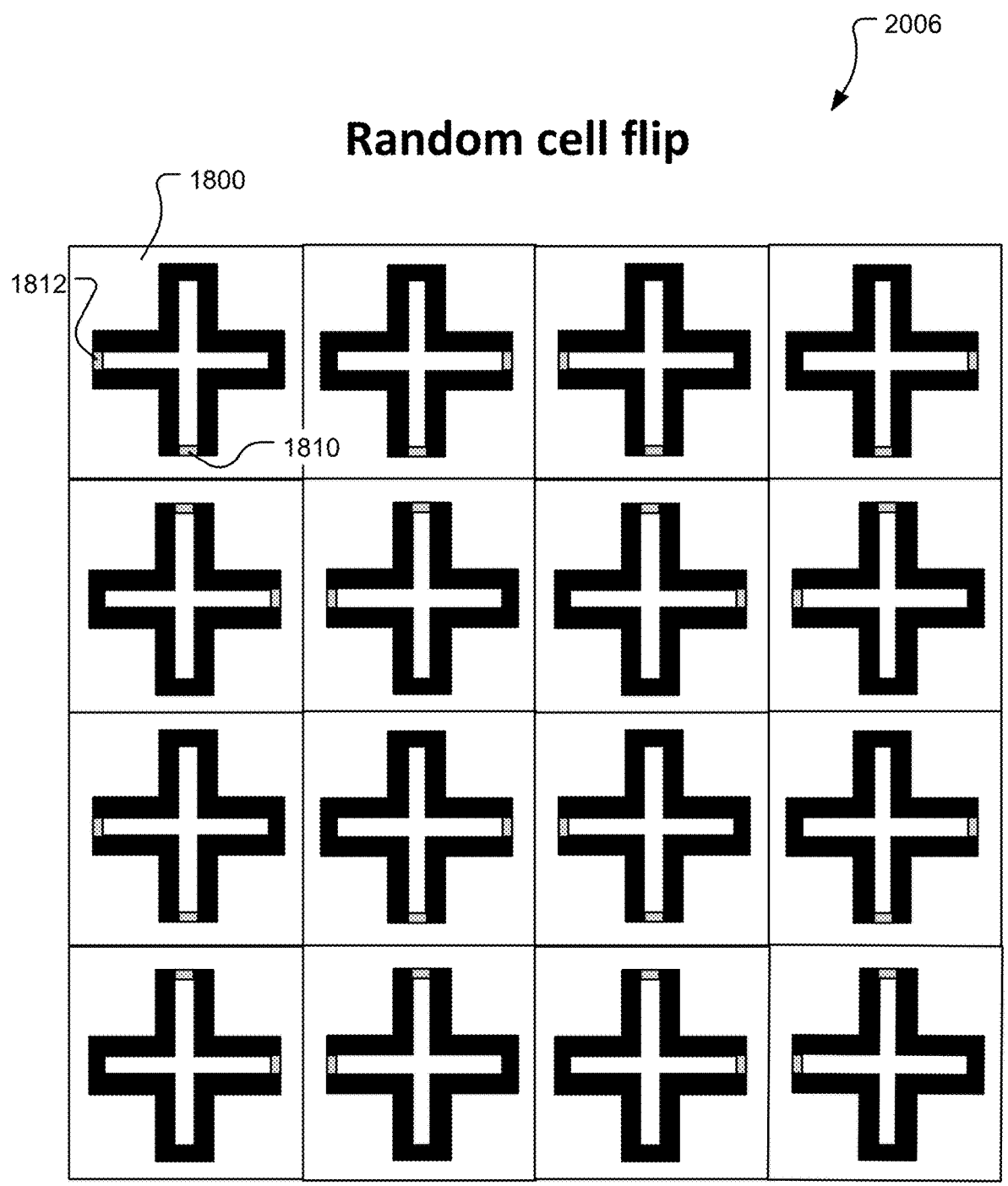

Referring to FIGS. 20A-20C, example pMIMO surfaces with variation of orientations for the unit cell 1800 are shown. The orientations of the unit cells 1800 in the pMIMO surfaces is based on the relative positions of the first and second varactor diodes 1810, 1812 within an array. The different implementations cell orientation variations within the pMIMO surfaces may be used to achieve symmetry and to reduce cross-polarization in the redirected signals. A first pMIMO surface 2002 (i.e., a no cell flip variation) includes a plurality of unit cells 1800 arranged in an array such that each of the unit cells 1800 maintains the same relative orientation to one another. Each of the unit cells 1800 in the surface 2002 maintain the same orientation of the first and second varactor diodes 1810, 1812 relative to the surface orientation. A second pMIMO surface 2004 (i.e., an alternate cell flip variation) includes a plurality of unit cells 1800 arranged in an array such that the orientations of the unit cells 1800 flip from one cell to the next. A third pMIMO surface 2006 (i.e., a random cell flip variation) includes a plurality of unit cells 1800 arranged in an array such that the orientations of the unit cells 1800 vary randomly from one cell to the next. In an example, the orientations of the unit cells in the second pMIMO surface 2004 and the third pMIMO surface 2006 are configured such that orientations of a first unit cell of the plurality of unit cells in the pMIMO surface is different from at least one adjacent unit cell of the plurality of unit cells in the pMIMO surface. While the pMIMO surfaces 2002, 2004, 2006 are depicted as 4×4 arrays, other array dimensions (e.g., 4×2, 8×4, 8×8, 9×11, etc.) may utilize similar variations in unit cell orientations.

Figure 21:
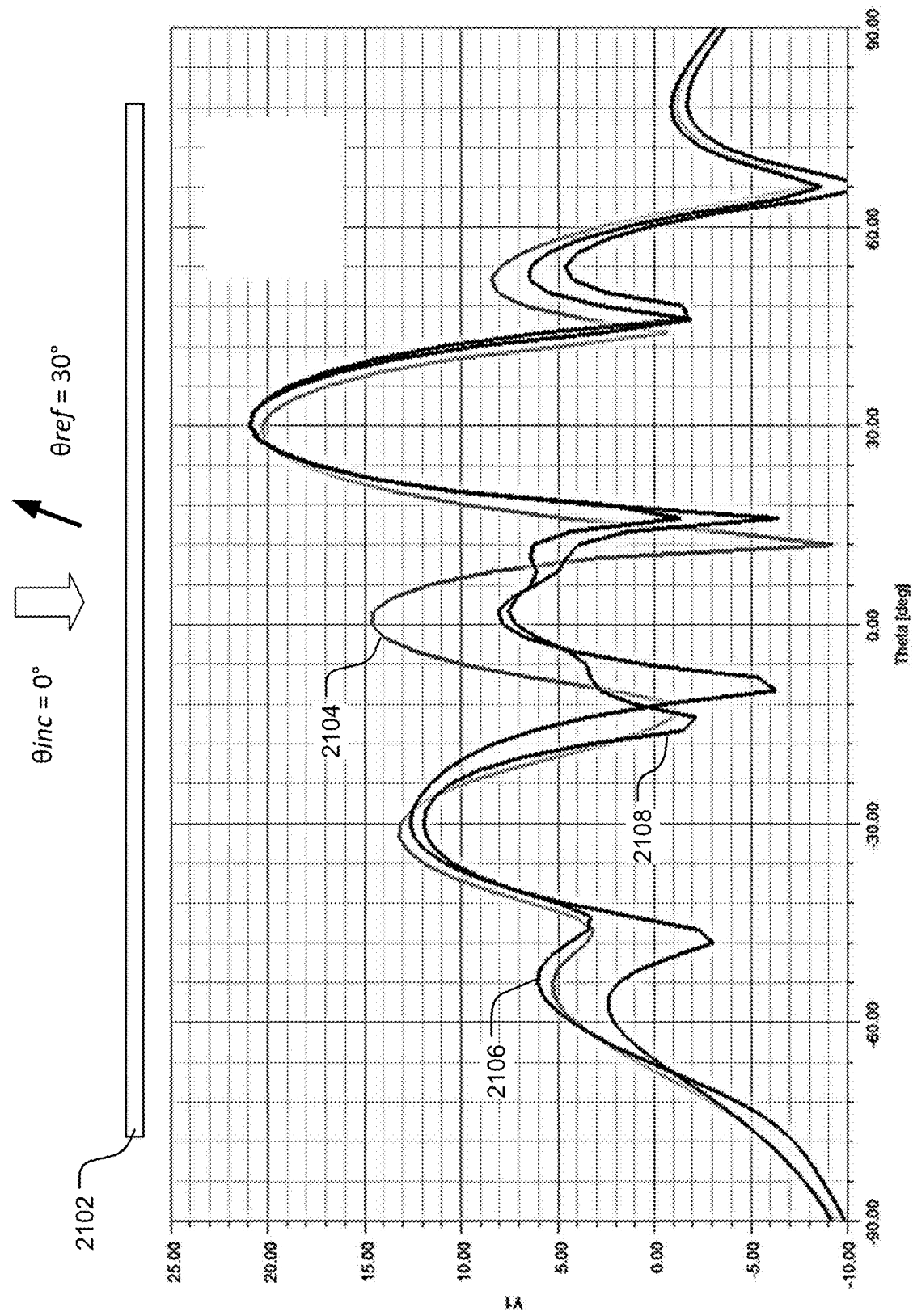
FIG. 21 includes example angle response curves for pMIMO surfaces with different unit cell orientations.

In operation, the variation of cell unit orientations may impact the directivity of the pMIMO surface. Referring to FIG. 21, example angle response curves for the pMIMO surfaces with different unit cell orientations are shown. The angle response curves are based on a 0° incident beam that is reflected to 30° by three different pMIMO surfaces corresponding to the orientations described in FIGS. 20A-20C, which are collectively labeled as pMIMO surface 2102 in FIG. 21. While each variation demonstrates a primary lobe on the selected reflected angle (e.g., the orientations produced different side lobe patterns. For example, a first response curve 2104 corresponds to the first pMIMO surface 2002 (i.e., the no cell flip variation) and includes a relatively higher reflected side lobe at 0°. A second response curve 2106 corresponds to the second pMIMO surface 2004 (i.e., the alternate cell flip variation) demonstrates generally improved side lobe performance, but does include a relatively higher side lobe at approximately −50°. A third response curve 2108 corresponds to the third pMIMO surface 2006 (i.e., the random cell flip variation) and demonstrates an improvement of side lobe performance as compared to the first and second pMIMO surface 2002, 2004. The response curves 2104, 2106, 2108 are examples, and not limitations, as other surface configurations, incident and reflective angles may yield different directivity characteristics.

Figure 22:
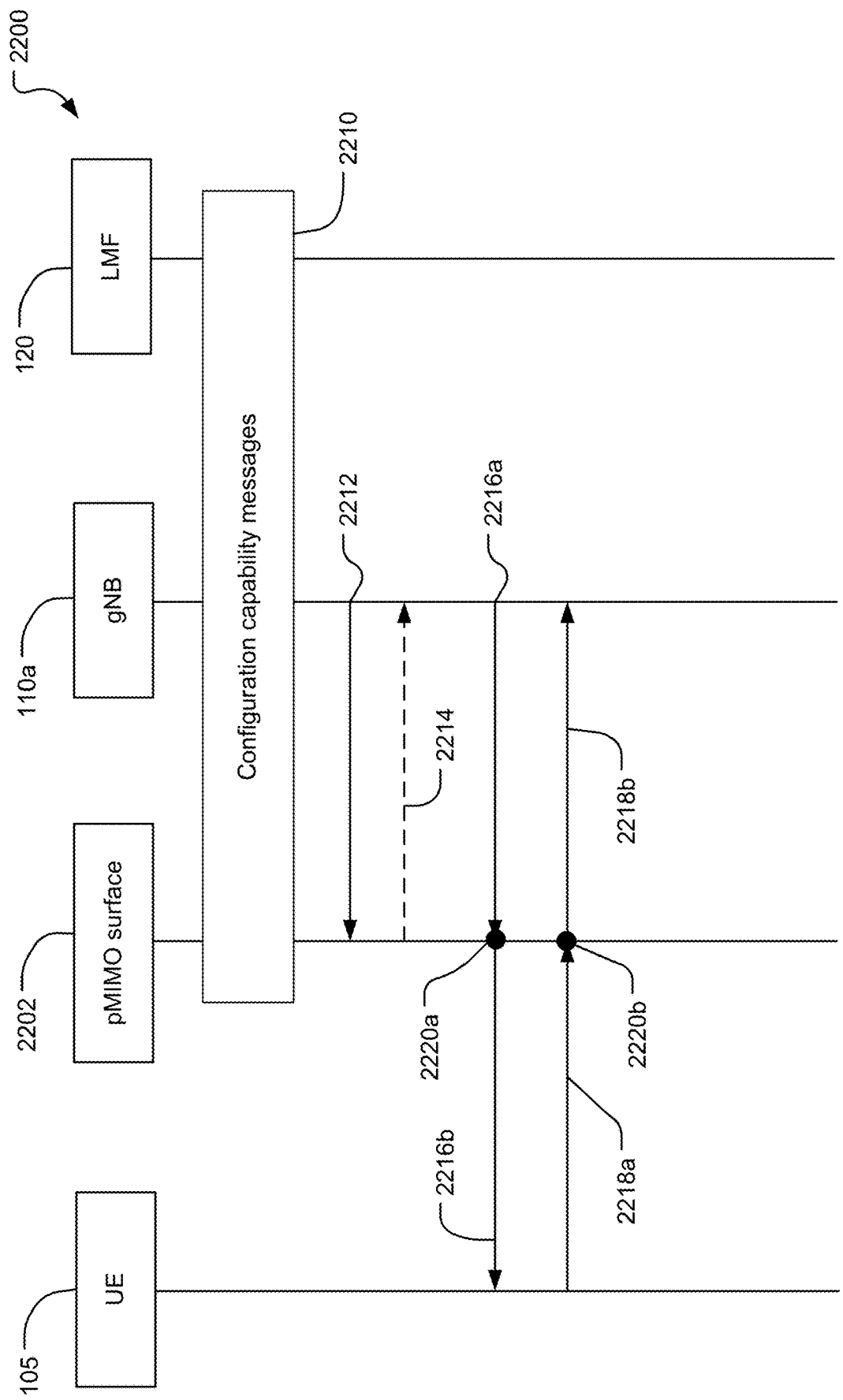
FIG. 22 is an example message flow for utilizing a pMIMO surface in a cellular network.

Referring to FIG. 22, an example message flow 2200 for utilizing a pMIMO surface in a cellular network is shown. The message flow 2200 may be utilized by the communication system 100, for example, including at least one pMIMO surface 2202 located between the gNB 110a and the UE 105. The LMF 120 may be configured to maintain location information for the UE 105, the gNB 110a, and the pMIMO surface 2202 via mobility management or other positioning operations. The gNB 110a (and/or the AMF 115) may be configured to maintain position information associated with the UE 105. In an example, the pMIMO surface 2202 may be operably coupled to a TRP 300, or other hardware to enable the pMIMO surface 2202 to communicate via wired or wireless channels. At stage 2210, the LMF 120, gNB 110a and the pMIMO may be configured to exchange messages to establish configuration capability parameters for the pMIMO surface 2202. For example, the angle and elevation capabilities, frequency range, time constant(s), polarizations, code book values, and other physical and electrical attributes of the pMIMO surface 2202 may be established or confirmed. The configuration capability messages may utilize network protocols such as LPP/NPP, NRPPa and the like to exchange configuration information. The gNB 110a may be configured to send one or more initialization messages 2212 indicating a required reflection angle (e.g., based on the location of the UE 105) in preparation for communicating with the UE 105. Other configuration information, such as code book values used by the controller 1006 to configured the phase shifting components may be included in the initialization messages 2212 to enable the pMIMO surface 2202 to reflect signals between the gNB 110a and the UE 105. In an example, the initialization messages 2212 may utilize RRC, MAC-CE, or Downlink Control Information (DCI) protocols to convey the required configuration information. Other wired and wireless signaling techniques may also be used to initialize the pMIMO surface 2202. For example, the pMIMO surface may be configured to communicate with the gNB 110a via the X2 interface. The pMIMO surface 2202 may optionally be configured to send a response messages 2214 to confirm the initialization messages 2212 or indicate a cannot comply status. In an example, the initialization messages 2212 may include angle information, control voltage information, or other parameters to enable the controller 1006 to set the capacitance of the two varactor diodes 1810, 1812 in each of the unit cells in the pMIMO surface 2202. The gNB 110a transmits one or more signals 2216a directed towards the pMIMO surface 2202, which generates corresponding reflected signals 2216b directed to the UE 105 via a reflecting operation 2220a. The UE 105 may transmit one or more reply signals 2218a directed toward the pMIMO surface 2202, which generates corresponding reflected reply signals 2218b directed towards the gNB 110a via a reciprocal reflecting operation 2220b. The roles of the gNB 110a and the UE 105 may be reversed, such that the UE 105 may be configured to transmit one or more initialization messages 2212 to configure the pMIMO surface 2202 to reflect signals transmitted by the UE 105 to the gNB 110a (or another station). The message flow 2200 is an example, and not a limitation, as other signaling may be included, and messages may be removed, rearranged, combined, or performed concurrently.

Figure 23:
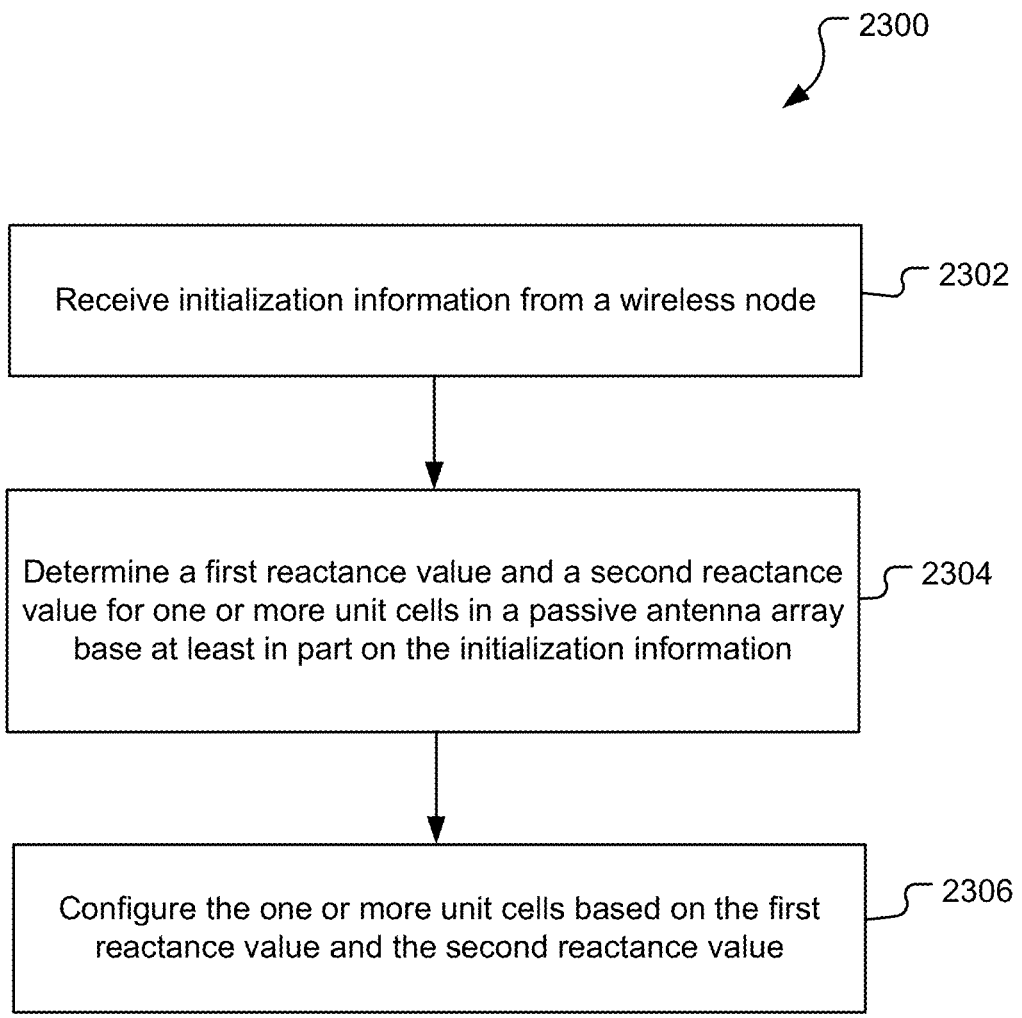
FIG. 23 is a block flow diagram of an example method for configuring a pMIMO surface.

Referring to FIG. 23, with further reference to FIGS. 1-22, a method 2300 for configuring a pMIMO surface includes the stages shown. The method 2300 is, however, an example and not limiting. The method 2300 may be altered, e.g., by having stages added, removed, rearranged, combined, performed concurrently, and/or having single stages split into multiple stages.

At stage 2302, the method includes receiving initialization information from a wireless node. A pMIMO hardware implementation 1000, including the processor 310 and the transceiver 315, is a means for receiving initialization information. In an example, a wireless node such as the gNB 110a or the UE 105 may be configured to provide initialization messages including code book values, controller power setting, location information, or desired reflection angle information to a pMIMO surface 2202. The initialization information is configured to enable the pMIMO surface 2202 to make required phase shifting adjustments in the unit cells to enable a desired reflected beam direction based on receiving an beam at an expected incident angle.

At stage 2304, the method includes determining a first reactance value and a second reactance value for one or more unit cells in an array of reconfigurable reflective elements based at least in part on the one or more initialization messages. The pMIMO hardware implementation 1000, including the controller 1006, is a means for determining the first reactance value and the second reactance value. In an example, the controller 1006 may include a code book, look-up table, or other data structure, containing control voltage settings for the two phase shifting components 1104, 1106 (or the two varactor diodes 1810, 1812 based on the pMIMO configuration) to enable the pMIMO surface to reflect a signal at a desired angle. In an example, the initialization information may include a location of a receiving wireless node and the controller 1006 may be configured to determine the first and second reactance values based on the locations of the receiving wireless node, the location of the pMIMO surface, and the location of the transmitting wireless node. Other combinations of information may be included in the initialization information. In an example, the initialization information may indicate a desired reflected angle and the controller 1006 may be configured to determine the control voltage required to realize the first and second reactance values based on the expected incident angle of the transmitted signal. In an example, the wireless node or other network resources may have a code book associated with the pMIMO surface and the initialization information may include the control voltages for the controller to use to obtain the required first and second reactance values. The first and second reactance values may vary or may be the same for each unit cell in the pMIMO surface. A code book may be configured to associate the first and second reactance values for individual unit cells, or groups of unit cells to achieve the desired reflected angle based on the angle of incidence and polarization of the incoming signal. In an example, the initialization information may include one or more index values associated with one or more beam angles (e.g., azimuth and elevation), and the controller 1006 may be configured to obtain control values from a code book based on the one or more index values.

At stage 2306, the method includes configuring the one or more unit cells based on the first reactance value and the second reactance value. The pMIMO hardware implementation 1000, including the controller 1006, is a means for configuring the one or more unit cells. In an example, the phase shifting components 1104, 1106 (including the varactor diodes 1810, 1812) may utilize an analog voltage signal to vary the reactance of the component. Other variable capacitor configurations may also be used. For example, digital capacitor arrays, phase shifters, and other phase shifting components may have configurable reactance values. The two phase shifting components in each of the unit cells in the pMIMO surface may be coupled to the controller 1006, and the controller 1006 may provide a control signal to cause the phase shifting components to vary their respect reactance values and cause a corresponding phase shift. The control signal may be based on locally stored code book values for the one or more unit cells. The control signals may be based on parameters provided in the initialization information received at stage 2302. The controller 1006 may be configured to send each unit cell in the pMIMO surface control signals for the two phase shifting components in the unit cell. In an example, the controller 1006 may be configured to send groups of unit cells a control signal. Other control signal configurations may also be used.

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

As used herein, unless otherwise stated, a statement that a function or operation is "based on" an item or condition means that the function or operation is based on the stated item or condition and may be based on one or more items and/or conditions in addition to the stated item or condition.

Also, as used herein, "or" as used in a list of items prefaced by "at least one of" or prefaced by "one or more of" indicates a disjunctive list such that, for example, a list of "at least one of A, B, or C," or a list of "one or more of A, B, or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B means that the item may be configured to perform the function regarding A, or may be configured to perform the function regarding B, or may be configured to perform the function regarding A and B. For example, a phrase of "a processor configured to measure at least one of A or B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

Unless otherwise indicated, "about" and/or "approximately" as used herein when referring to a measurable value such as an amount, a temporal duration, and the like, encompasses variations of ±20% or ±10%, ±5%, or +0.1% from the specified value, as appropriate in the context of the systems, devices, circuits, methods, and other implementations described herein. Unless otherwise indicated, "substantially" as used herein when referring to a measurable value such as an amount, a temporal duration, a physical attribute (such as frequency), and the like, also encompasses variations of ±20% or ±10%, ±5%, or +0.1% from the specified value, as appropriate in the context of the systems, devices, circuits, methods, and other implementations described herein.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

Implementation examples are described in the following numbered clauses:

Clause 1. An array of reconfigurable reflective elements, comprising:
a plurality of unit cells each comprising a radiating element, a first power divider aligned to a first polarization and electrically coupled to a first phase shifting component, and a second power divider aligned to a second polarization and electrically coupled to a second phase shifting component; and a controller coupled to the first phase shifting component and the second phase shifting component and configured to provide control signals to the first phase shifting component and the second phase shifting component to vary a direction of a reflected signal.

Clause 2. The array of reconfigurable reflective elements of clause 1 wherein one or more of the plurality of unit cells further comprises a parasitic element configured to electromagnetically couple with the radiating element.

Clause 3. The array of reconfigurable reflective elements of clause 2 wherein the parasitic element is one of a metallic patch, a dielectric resonator antenna, a lens parasitic element, one or more parasitic dipole elements, or any combinations thereof.

Clause 4. The array of reconfigurable reflective elements of clause 1 wherein the radiating element is a slot radiator.

Clause 5. The array of reconfigurable reflective elements of clause 1 wherein the first power divider is disposed on a first side of a first dielectric substrate, the second power divider is disposed on a second side of the first dielectric substrate, and the radiating element is disposed within the first dielectric substrate between the first power divider and the second power divider.

Clause 6. The array of reconfigurable reflective elements of clause 5 further comprising a parasitic element disposed on a second dielectric substrate and a first air gap disposed between the first dielectric substrate and the second dielectric substrate.

Clause 7. The array of reconfigurable reflective elements of clause 5 further comprising a metallic reflector and a second air gap disposed between the first dielectric substrate and the metallic reflector.

Clause 8. The array of reconfigurable reflective elements of clause 1 wherein the first phase shifting component and the second phase shifting component include a varactor, a digital capacitor array, a switchable array of delay lines, a switchable array of inductors and capacitors, a phase shifter, or any combinations thereof.

Clause 9. The array of reconfigurable reflective elements of clause 1 wherein a subset of the plurality of unit cells are configured as one or more direction of arrival arrays and the controller is configured to determine at least one of an azimuth angle and an elevation angle of an incoming radio frequency signal based at least in part on phase information obtained with the direction of arrival arrays.

Clause 10. An array of reconfigurable reflective elements, comprising:
a plurality of unit cells each comprising a cross-slot radiating element, a first varactor diode disposed across a first end of the cross-slot radiating element and configured to control polarization in a first plane, and a second varactor diode disposed across a second end of the cross-slot radiating element and configured to control polarization in a second plane; and a controller coupled to the first varactor diode and the second varactor diode and configured to provide control signals to the first varactor diode and the second varactor diode to vary a direction of a reflected signal.

Clause 11. The array of reconfigurable reflective elements of clause 10 wherein the cross-slot radiating element is disposed on a printed wiring board comprising a dielectric material.

Clause 12. The array of reconfigurable reflective elements of clause 11 further comprising a metallic ground layer disposed below the printed wiring board.

Clause 13. The array of reconfigurable reflective elements of clause 12 further comprising dielectric foam disposed between the printed wiring board and the metallic ground layer.

Clause 14. The array of reconfigurable reflective elements of clause 10 wherein an orientation of a unit cell is based on a location of the first varactor diode relative to a location of the second varactor diode, and an orientation of a first unit cell of the plurality of unit cells in the array of reconfigurable reflective elements is different from an orientation of at least one adjacent unit cell of the plurality of unit cells in the array of reconfigurable reflective elements.

Clause 15. The array of reconfigurable reflective elements of clause 10 wherein a subset of the plurality of unit cells are configured as one or more direction of arrival arrays and the controller is configured to determine at least one of an azimuth angle and an elevation angle of an incoming radio frequency signal based at least in part on phase information obtained with the direction of arrival arrays.

Clause 16. The array of reconfigurable reflective elements of clause 10 wherein the plurality of unit cells are disposed in an and array comprising 9 columns and 11 rows of unit cells.

Clause 17. A method of configuring an array of reconfigurable reflective elements, comprising: receiving initialization information from a wireless node; determining a first reactance value and a second reactance value for one or more unit cells in the array of reconfigurable reflective elements based at least in part on the initialization information; and configuring the one or more unit cells based on the first reactance value and the second reactance value.

Clause 18. The method of clause 17 wherein the initialization information includes a requested reflection angle and determining the first reactance value and the second reactance value for the one or more unit cells includes obtaining one or more control parameters from a code book based on the requested reflection angle.

Clause 19. The method of clause 17 wherein the initialization information includes one or more index values and determining the first reactance value and the second reactance value for the one or more unit cells includes obtaining one or more control parameters from a code book based on the one or more index values.

Clause 20. The method of clause 17 wherein the initialization information is included in at least one of a radio resource control message, a medium access control control element, or a downlink control information message.

Clause 21. The method of clause 17 wherein the wireless node is a base station.

Clause 22. The method of clause 21 wherein the initialization information is received via a wired network connection.

Clause 23. The method of clause 17 wherein the wireless node is a user equipment.

Clause 24. An apparatus, comprising: a memory; at least one transceiver; at least one processor communicatively coupled to the memory and the at least one transceiver, and configured to: receive initialization information from a wireless node; determine a first reactance value and a second reactance value for one or more unit cells in an array of reconfigurable reflective elements based at least in part on the initialization information; and configure the one or more unit cells based on the first reactance value and the second reactance value.

Clause 25. The apparatus of clause 24 wherein the initialization information includes a requested reflection angle and the at least one processor is further configured to obtain one or more control parameters from a code book based on the requested reflection angle to determine the first reactance value and the second reactance value for the one or more unit cells.

Clause 26. The apparatus of clause 24 wherein the initialization information includes one or more index values and the at least one processor is further configured to obtain one or more control parameters from a code book based on the one or more index values to determine the first reactance value and the second reactance value for the one or more unit cells.

Clause 27. The apparatus of clause 24 wherein the initialization information is included in at least one of a radio resource control message, a medium access control control element, or a downlink control information message.

Clause 28. The apparatus of clause 24 wherein the wireless node is a base station.

Clause 29. The apparatus of clause 28 wherein the initialization information is received via a wired network connection.

Clause 30. The apparatus of clause 24 wherein the wireless node is a user equipment.

Clause 31. An apparatus for configuring an array of reconfigurable reflective elements, comprising: means for receiving initialization information from a wireless node; means for determining a first reactance value and a second reactance value for one or more unit cells in the array of reconfigurable reflective elements based at least in part on the initialization information; and means for configuring the one or more unit cells based on the first reactance value and the second reactance value.

Clause 32. A non-transitory processor-readable storage medium comprising processor-readable instructions configured to cause one or more processor to configure an array of reconfigurable reflective elements, comprising code for: receiving initialization information from a wireless node; determining a first reactance value and a second reactance value for one or more unit cells in the array of reconfigurable reflective elements based at least in part on the initialization information; and configuring the one or more unit cells based on the first reactance value and the second reactance value.

The invention claimed is:

1. An array of reconfigurable reflective elements, comprising:
a plurality of unit cells each comprising a radiating element, a first power divider aligned to a first polarization and electrically coupled to a first phase shifting component, and a second power divider aligned to a second polarization and electrically coupled to a second phase shifting component; and
a controller coupled to the first phase shifting component and the second phase shifting component and configured to provide control signals to the first phase shifting component and the second phase shifting component to vary a direction of a reflected signal.

2. The array of reconfigurable reflective elements of claim 1 wherein one or more of the plurality of unit cells further comprises a parasitic element configured to electromagnetically couple with the radiating element.

3. The array of reconfigurable reflective elements of claim 2 wherein the parasitic element is one of a metallic patch, a dielectric resonator antenna, a lens parasitic element, one or more parasitic dipole elements, or any combinations thereof.

4. The array of reconfigurable reflective elements of claim 1 wherein the radiating element is a slot radiator.

5. The array of reconfigurable reflective elements of claim 1 wherein the first power divider is disposed on a first side of a first dielectric substrate, the second power divider is disposed on a second side of the first dielectric substrate, and the radiating element is disposed within the first dielectric substrate between the first power divider and the second power divider.

6. The array of reconfigurable reflective elements of claim 5 further comprising a parasitic element disposed on a second dielectric substrate and a first air gap disposed between the first dielectric substrate and the second dielectric substrate.

7. The array of reconfigurable reflective elements of claim 5 further comprising a metallic reflector and a second air gap disposed between the first dielectric substrate and the metallic reflector.

8. The array of reconfigurable reflective elements of claim 1 wherein the first phase shifting component and the second phase shifting component include a varactor, a digital capacitor array, a switchable array of delay lines, a switchable array of inductors and capacitors, a phase shifter, or any combinations thereof.

9. The array of reconfigurable reflective elements of claim 1 wherein a subset of the plurality of unit cells are configured as one or more direction of arrival arrays and the controller is configured to determine at least one of an azimuth angle and an elevation angle of an incoming radio frequency signal based at least in part on phase information obtained with the direction of arrival arrays.

10. An array of reconfigurable reflective elements, comprising:
  a plurality of unit cells each comprising a cross-slot radiating element, a first varactor diode disposed across a first end of the cross-slot radiating element and configured to control polarization in a first plane, and a second varactor diode disposed across a second end of the cross-slot radiating element and configured to control polarization in a second plane; and
  a controller coupled to the first varactor diode and the second varactor diode and configured to provide control signals to the first varactor diode and the second varactor diode to vary a direction of a reflected signal;
  wherein an orientation of a unit cell is based on a location of the first varactor diode relative to a location of the second varactor diode, and an orientation of a first unit cell of the plurality of unit cells in the array of reconfigurable reflective elements is different from an orientation of at least one adjacent unit cell of the plurality of unit cells in the array of reconfigurable reflective elements.

11. The array of reconfigurable reflective elements of claim 10 wherein the cross-slot radiating element is disposed on a printed wiring board comprising a dielectric material.

12. The array of reconfigurable reflective elements of claim 11 further comprising a metallic ground layer disposed below the printed wiring board.

13. The array of reconfigurable reflective elements of claim 12 further comprising dielectric foam disposed between the printed wiring board and the metallic ground layer.

14. The array of reconfigurable reflective elements of claim 10 wherein a subset of the plurality of unit cells are configured as one or more direction of arrival arrays and the controller is configured to determine at least one of an azimuth angle and an elevation angle of an incoming radio frequency signal based at least in part on phase information obtained with the one or more direction of arrival arrays.

15. The array of reconfigurable reflective elements of claim 10 wherein the plurality of unit cells are disposed in an and array comprising 9 columns and 11 rows of unit cells.

16. A method of configuring an array of reconfigurable reflective elements, comprising:
  receiving initialization information from a wireless node;
  determining a first reactance value and a second reactance value for one or more unit cells in the array of reconfigurable reflective elements based at least in part on the initialization information; and
  configuring the one or more unit cells based on the first reactance value and the second reactance value.

17. The method of claim 16 wherein the initialization information includes a requested reflection angle and determining the first reactance value and the second reactance value for the one or more unit cells includes obtaining one or more control parameters from a code book based on the requested reflection angle.

18. The method of claim 16 wherein the initialization information includes one or more index values and determining the first reactance value and the second reactance value for the one or more unit cells includes obtaining one or more control parameters from a code book based on the one or more index values.

19. The method of claim 16 wherein the initialization information is included in at least one of a radio resource control message, a medium access control control element, or a downlink control information message.

20. The method of claim 16 wherein the wireless node is a base station.

21. The method of claim 20 wherein the initialization information is received via a wired network connection.

22. The method of claim 16 wherein the wireless node is a user equipment.

* * * * *